US011048991B2

(12) United States Patent
Mosteller et al.

(10) Patent No.: US 11,048,991 B2
(45) Date of Patent: Jun. 29, 2021

(54) EDGE-TO-EDGE METAL CARD AND PRODUCTION METHOD

(71) Applicant: CPI CARD GROUP—COLORADO, INC., Littleton, CO (US)

(72) Inventors: Barry Mosteller, Castle Pines, CO (US); James P. Colleran, Centennial, CO (US)

(73) Assignee: CPI CARD GROUP—COLORADO, INC., Littleton, CO (US)

( * ) Notice: Subject to any disclaimer, the term of this patent is extended or adjusted under 35 U.S.C. 154(b) by 0 days.

(21) Appl. No.: 16/484,392

(22) PCT Filed: Feb. 14, 2018

(86) PCT No.: PCT/US2018/018201
§ 371 (c)(1),
(2) Date: Aug. 7, 2019

(87) PCT Pub. No.: WO2018/152218
PCT Pub. Date: Aug. 23, 2018

(65) Prior Publication Data
US 2019/0385035 A1 Dec. 19, 2019

Related U.S. Application Data

(60) Provisional application No. 62/458,987, filed on Feb. 14, 2017, provisional application No. 62/520,384, filed on Jun. 15, 2017.

(51) Int. Cl.
*G06K 19/02* (2006.01)
*G06K 19/06* (2006.01)
*G06K 19/07* (2006.01)

(52) U.S. Cl.
CPC ....... *G06K 19/07* (2013.01); *G06K 19/06187* (2013.01)

(58) Field of Classification Search
USPC ............... 235/380, 449, 451, 488, 492, 375
See application file for complete search history.

(56) References Cited

U.S. PATENT DOCUMENTS

| 3,688,088 A | 8/1972 | Brown et al. |
| 3,855,033 A | 12/1974 | Staats |
| 3,896,726 A | 7/1975 | Staats |
| 3,949,501 A | 4/1976 | Andrews et al. |

(Continued)

*Primary Examiner* — Tuyen K Vo
(74) *Attorney, Agent, or Firm* — Dorsey & Whitney LLP

(57) ABSTRACT

Edge-to-edge metal transaction cards and associated production methods are disclosed. The transaction cards include a metallic member and an interconnected first core layer that each extend from edge-to-edge about the length and width of the transaction card. In one approach, the metallic member may extend substantially continuously across the lateral extent of the card (e.g. except for a pocket that receives an IC chip and contact pads), and the first core layer may be transparent with printing on an inward-facing and/or outward-facing side. In another approach, the metallic member may be frame-like with an inlay and supportably interconnected inlay antenna disposed in an opening through the metallic member. A second core layer may be interconnected to a second side of the metallic member. A metal face may be provided on an outward-facing side of the first core layer and/or second core layer.

34 Claims, 16 Drawing Sheets

(56) References Cited

U.S. PATENT DOCUMENTS

| | | |
|---|---|---|
| 4,097,279 A | 6/1978 | Whitehead |
| 4,223,918 A | 9/1980 | Smoczynski |
| 4,568,824 A | 2/1986 | Gareis et al. |
| 4,592,976 A | 6/1986 | Whitehead |
| 4,677,285 A | 6/1987 | Taniguchi |
| 4,746,392 A | 5/1988 | Hoppe |
| 4,897,533 A | 1/1990 | Lyszczarz |
| 4,931,629 A | 6/1990 | Frankfurt |
| 5,215,792 A | 6/1993 | Miller |
| 5,513,019 A | 4/1996 | Cueli |
| 5,559,370 A | 9/1996 | Berney |
| 5,667,876 A | 9/1997 | Radlicz |
| 5,690,773 A | 11/1997 | Fidalgo et al. |
| 5,877,941 A | 3/1999 | Ryu |
| 5,965,867 A | 10/1999 | Haghiri-Tehrani |
| 6,006,456 A | 12/1999 | Hiromachi et al. |
| 6,025,283 A | 2/2000 | Roberts |
| 6,164,548 A | 12/2000 | Curiel |
| 6,202,931 B1 | 3/2001 | Billebaud |
| 6,239,976 B1 | 5/2001 | Templeton et al. |
| 6,352,604 B2 | 3/2002 | Droz |
| 6,471,128 B1 | 10/2002 | Corcoran et al. |
| 6,644,552 B1 | 11/2003 | Herslow |
| 6,942,156 B2 | 9/2005 | Ohta et al. |
| 6,986,467 B2 | 1/2006 | Takahashi et al. |
| 7,269,021 B2 | 9/2007 | Gundlach et al. |
| 7,287,704 B2 | 10/2007 | Herslow |
| 7,306,163 B2 | 12/2007 | Scholz et al. |
| 7,398,917 B2 | 7/2008 | Aibazov et al. |
| 7,413,128 B2 | 8/2008 | Waldo et al. |
| 7,494,057 B2 | 2/2009 | Lasch et al. |
| 7,503,503 B2 | 3/2009 | Riedl et al. |
| 7,530,491 B2 | 5/2009 | Lasch et al. |
| 7,588,184 B2 | 9/2009 | Gandel et al. |
| D602,986 S | 10/2009 | Skelding et al. |
| D623,690 S | 9/2010 | Skelding et al. |
| 7,819,310 B2 | 10/2010 | Lasch et al. |
| 7,823,777 B2 | 11/2010 | Varga et al. |
| D635,186 S | 3/2011 | Skelding et al. |
| 7,971,786 B2 | 7/2011 | Lasch et al. |
| D643,062 S | 8/2011 | Skelding et al. |
| 8,033,457 B2 | 10/2011 | Varga et al. |
| 8,061,618 B2 | 11/2011 | Mosteller |
| 8,079,514 B2 | 12/2011 | Lasch et al. |
| 8,186,582 B2 | 5/2012 | Varga et al. |
| 8,305,764 B2 | 11/2012 | Rietzler |
| 8,413,894 B2 | 4/2013 | Bona et al. |
| 8,434,675 B2 | 5/2013 | Faith |
| 8,448,868 B2 | 5/2013 | Mueller-Hipper et al. |
| 8,594,730 B2 | 11/2013 | Bona et al. |
| 8,672,232 B2 | 3/2014 | Herslow |
| 8,725,589 B1 | 5/2014 | Skelding et al. |
| 8,807,437 B2 | 8/2014 | Reed et al. |
| 8,857,722 B2 | 10/2014 | Mosteller et al. |
| 8,944,810 B2 | 2/2015 | Herslow |
| 9,058,548 B2 | 6/2015 | Reed et al. |
| 9,117,155 B2 | 8/2015 | Mosteller |
| 9,390,363 B1 * | 7/2016 | Herslow .................. B32B 27/08 |
| 9,430,724 B2 | 8/2016 | Mosteller |
| 9,779,343 B2 | 10/2017 | Mosteller |
| 10,032,099 B2 | 7/2018 | Mosteller |
| 10,255,536 B2 | 4/2019 | Mosteller |
| 2002/0070279 A1 | 6/2002 | Zausner |
| 2003/0178495 A1 * | 9/2003 | Jones ................ G06K 19/07745 |
| | | 235/492 |
| 2004/0011877 A1 | 1/2004 | Reppermund |
| 2005/0230822 A1 | 10/2005 | Tran |
| 2005/0242194 A1 * | 11/2005 | Jones ................... B42D 25/455 |
| | | 235/487 |
| 2005/0247795 A1 | 11/2005 | Riedl et al. |
| 2006/0124753 A1 | 6/2006 | Scholz et al. |
| 2007/0089831 A1 | 4/2007 | Florentino et al. |
| 2007/0243362 A1 * | 10/2007 | Gilbert ................ B29B 17/0042 |
| | | 428/195.1 |
| 2009/0169776 A1 | 7/2009 | Herslow |
| 2009/0294543 A1 * | 12/2009 | Varga ................ G06K 19/07745 |
| | | 235/492 |
| 2011/0020606 A1 | 1/2011 | Herslow et al. |
| 2011/0031319 A1 | 2/2011 | Kiekhaefer et al. |
| 2011/0073660 A1 | 3/2011 | Lawyer |
| 2011/0108629 A1 | 5/2011 | Mueller-Hipper et al. |
| 2011/0140841 A1 | 6/2011 | Bona et al. |
| 2011/0189620 A1 | 8/2011 | Herslow |
| 2012/0204419 A1 | 8/2012 | Varga et al. |
| 2012/0313754 A1 | 12/2012 | Bona |
| 2013/0228628 A1 | 9/2013 | Bona et al. |
| 2013/0255078 A1 | 10/2013 | Cox |
| 2013/0255848 A1 | 10/2013 | Cox |
| 2013/0258622 A1 | 10/2013 | Cox |
| 2013/0260065 A1 | 10/2013 | Cox |
| 2013/0261262 A1 | 10/2013 | Cox |
| 2013/0320095 A1 | 12/2013 | Blum |
| 2014/0021261 A1 | 1/2014 | Mosteller |
| 2014/0052630 A1 | 2/2014 | Bona et al. |
| 2015/0041546 A1 * | 2/2015 | Herslow .......... G06K 19/07722 |
| | | 235/492 |
| 2015/0115039 A1 * | 4/2015 | Mosteller ............. G06K 19/022 |
| | | 235/488 |
| 2015/0136858 A1 | 5/2015 | Finn et al. |
| 2015/0269477 A1 | 9/2015 | Finn et al. |
| 2018/0339503 A1 * | 11/2018 | Finn .................... H01Q 1/2225 |
| 2019/0180156 A1 | 6/2019 | Mosteller et al. |

\* cited by examiner

EDGE-TO-EDGE METAL CARD AND PRODUCTION METHOD

RELATED APPLICATIONS

This application is a national phase application of PCT/US2018/018201, filed Feb. 14, 2008 , entitled "EDGE-TO-EDGE METAL CARD AND PRODUCTION METHOD", which claims the benefit of priority to U.S. Provisional Patent Application No. 62/458,987, filed Feb. 14, 2017, entitled "EDGE-TO-EDGE METAL CARD AND PRODUCTION METHOD", as well as U.S. Provisional Patent Application No. 62/520,384, entitled "EDGE-TO-EDGE METAL CARD AND PRODUCTION METHOD", filed Jun. 15, 2017, all of-which are incorporated herein by reference in their entirety.

BACKGROUND

The prevalence of the use of transaction cards continues to grow. With the increasing use of transaction cards by individuals for value in purchases, the market for different types of transaction cards also continues to grow.

In this regard, a number of different varieties of cards are offered to consumers that may each offer a unique set of benefits and features. For example, a number of ultra-premium transaction card types have been proposed that are marketed to individuals with high net worth that also establish large balances using a transaction card. Card issuers that offer such ultra-premium transaction card types often provide associated premium services to holders of such ultra-premium transaction cards such as, for example, concierge services, increased involvement rewards programs, increased travel benefits, consumer protection features with respect items purchased using such cards, or other ultra-premium services not typically offered with standard transaction cards.

In addition to ultra-premium services offered in connection with such transaction cards, card issuers may also wish to provide a premium physical card as evidence of the ultra-premium nature of the transaction card. In fact, the awareness of such ultra-premium transaction cards has grown to the point where such ultra-premium cards have become associated with the high net worth individuals to whom such cards are issued. In this regard, such ultra-premium cards have become status symbols for many individuals.

To further increase the exclusivity of such cards and to differentiate such cards from traditional transaction cards, it has been proposed to manufacture cards using different precious metals rather than the typical plastic materials employed in traditional cards. For example, titanium, palladium, other precious metals, or the like have been proposed to be used to construct ultra-premium transaction cards. However, to produce precious metal cards of the kind proposed for use in the ultra-premium transaction card market, it is often the case that traditional methods of card manufacture are not applicable. In turn, the cost of such cards is often much greater than the cost associated with the production of traditional transaction cards made from plastics and the like.

SUMMARY

The present disclosure is directed to metal cards that offer enhanced weight and/or appearance characteristics, while also providing economical production and card reader interface advantages.

In a first aspect, a transaction card having a length and a width (e.g. a length, width and thickness in compliance with ISO/IEC Standard 7810) includes a first metallic member extending from edge-to-edge across the length and the width of the transaction card, and a first core layer interconnected to a first side of the first metallic member and extending from edge-to-edge across the length and the width of the transaction card (e.g. a polymer-based layer). Optionally, the first core layer may be transparent and may include reverse printing on an inward facing side thereof or forward printing on an outward facing side thereof, wherein the printing is visible from a first side of the transaction card. In turn, the first side of the first metallic member may also be visible through the first side of the transaction card.

In another approach, the first core layer may be opaque and may include forward printing on an outward-facing side thereof, wherein the printing is visible from the first side of the transaction card. In yet another approach, a metal face may be provided on an outward-facing side of the first core layer (e.g. a metal face defined by a continuous metallized surface or combinatively defined by at least two discontinuous, differently-patterned and non-contacting metallized surfaces), and may include forward printing on an outward-facing side of the metal face, wherein a continuous metal face appearance and the printing are visible from the first side of the transaction card.

In contemplated arrangements, the first metallic member may define a first area (e.g. across the lateral length and width thereof) that is at least about 80%, and in some implementations at least about 85%, of a second area defined by the length and width of the transaction card. In turn, a weight of the first metallic member may comprise not less than about 40% of a total weight of the transaction card, and in some arrangements, not less than about 60% of a total weight of the transaction card.

In some implementations, the transaction card may further include a second core layer interconnected to a second side of the first metallic member and extending from edge-to-edge across the length and the width of the transaction card (e.g. a polymer-based layer). Optionally, the second core layer may be transparent and may include reverse printing on an inward-facing side thereof or forward printing on an outward facing side thereof, wherein the printing is visible through and isolated from a second side of the transaction card opposite the first side thereof. In turn, the second side of the first metallic member may also be visible through the second side of the transaction card.

In another approach, the second core layer may be opaque and may include forward printing on an outward-facing side thereof, wherein the printing is visible from the second side of the transaction card. In yet another approach, a metal face may be provided on an outward-facing side of the second core layer (e.g. a metal face defined by a continuous metallized surface or combinatively defined by at least two discontinuous, differently-patterned and non-contacting metallized surfaces), and may include forward printing on an outward-facing side of the metal face, wherein a continuous metal face appearance and the printing are visible from the first side of the transaction card.

The printing provided on the first core layer and/or the second core layer may comprise one or more of graphics (e.g. a pictorial scene, a logo, a photo, etc.), human-readable characters (e.g. numbers, letters, and/or representations thereof), and/or machine-readable markings (e.g. a bar code, a multi-dimensional matrix code, etc.). In one arrangement, printing may be provided on the first core layer to present at least a first type of information, and printing may be provided on a second core layer to provide at least a second type of information that is different than the first type of information.

In contemplated embodiments, the transaction card may also include visible indicia indicative of and/or otherwise relating to an account associated with the transaction card (e.g. "personalization data"). By way of example, such visible indicia may comprise human-readable characters and/or machine-readable markings indicative of an account number and/or otherwise relating to a unique account to be administered by an issuer of the transaction card (e.g. a payment account administered by a financial institution such as a bank or credit union). In some arrangements, the visible indicia may be provided at an outside surface of the first side and/or an outside surface of the second side of the transaction card without defining raised surface portions (e.g. free from embossing).

In contemplated embodiments, peripheral edges of each of the first metallic member and the first and second core layers may extend continuously about the entire periphery of the transaction card. In turn, the peripheral edges of the first metallic member may be visible, as well as the first and/or second sides of the first metallic member, thereby yielding the appearance of a solid metal card having visible indicia, printing and other described features associated with premium metal transaction cards.

In some implementations, a first inner polymer-based adhesive layer (e.g. a thermoset and/or thermoplastic containing layer) may be disposed between and interconnecting the first metallic member and the inward-facing side of the first core layer, wherein the first inner polymer-based adhesive layer may be in direct contact with the inward-facing side of the first core layer and any printing provided thereupon. In such implementations, the first inner polymer-based adhesive layer may be transparent to facilitate viewing of the first side of the first metallic member through the first side of the transaction card.

Similarly, a second inner polymer-based adhesive layer (e.g. a thermoset and/or thermoplastic containing layer) may be disposed between an interconnecting the first metallic member and the inward-facing side of the second core layer, wherein the second inner polymer-based adhesive layer may be in direct contact with the inward-facing side of the second core layer and any printing provided thereupon. In such implementations, the second inner polymer-based adhesive layer may be transparent to facilitate viewing of the second side of the first metallic member through the second side of the transaction card.

In conjunction with some embodiments, the transaction card may also include a first film layer (e.g. a polymer-based layer) attached to an outward-facing side of the first core layer and extending from edge-to-edge across the length and width of the transaction card. The first film layer may be transparent to facilitate viewing of any printing on the first core layer and the first side of the first metallic member through the first side of the transaction card.

In contemplated arrangements, all or at least a portion of the visible indicia may be defined at an outward-facing surface of the first film layer (e.g. by at least one of laser engraving, ink jet printing and thermal printing). By way of particular example, visible indicia may be defined at the outward-facing surface of the first film layer by laser engraving, wherein the first film layer may comprise a polymer-based material having a laser reactive material dispersed therein (e.g. laser reactive particles that change from a transparent to opaque (e.g. colored) appearance in reaction to laser exposure, including carbon particles). When the visible indicia is defined by any of laser engraving, ink jet printing and thermo-printing, a carbon containing ink may be utilized for printing on the first core layer and/or second core layer. Alternatively, in laser engraving embodiments, carbonless ink may be utilized for printing on the first core layer and/or second core layer.

Similarly, the transaction card may include a second outer film layer (e.g. a polymer-based layer) attached to an outward-facing side of the second core layer and extending from edge-to-edge across the length and the width of the transaction card. In such implementations, the second film layer may be transparent to facilitate viewing of any printing on the second core layer and the second side of the first metallic member through the second side of the transaction card.

Where a first and/or second film layer is included, a corresponding first outer thermoset layer (e.g. a thermoset coating applied to an inward-facing side of the first film layer or applied to the outward-facing side of the first core layer) and/or second outer thermoset layer (e.g. a thermoset coating applied to an inward-facing side of the second film layer or applied to the outward-facing side of the second core layer) may be disposed to attach the outward-facing side of the first core layer and the inward-facing side of the first film layer and/or to attach the outward-facing side of the second core layer and an inward-facing side of the second outer film layer. As may be appreciated, the first outer thermoset layer and/or second outer thermoset layer may be transparent to facilitate viewing of printing on the first core layer and/or second core layer and the first metallic member through the first side and/or the second side of the transaction card.

In various embodiments, the first and second outer thermoset layers and/or the first and second inner polymer-based adhesive layers may each comprise a thermoset cross-linking polymer and thermoplastic composition. For example, such layers may comprise a urethane-based or polyurethane-based composition that includes a thermoset, cross-linking polymer.

In some implementations, the transaction card may include a pocket extending in to the transaction card from the first side thereof, wherein the pocket extends completely through the first core layer and the first metallic member. In turn, an integrated circuit chip may be located within the pocket. In that regard, the integrated circuit chip may be disposed in the pocket free from electrical interconnection with the first metallic member. The integrated circuit chip may be encoded to store data associated with the account indicated by or otherwise associated with the visible indicia (e.g. "personalization data").

In conjunction with such embodiments, the transaction card may further include a plurality of contact pads located and exposed within the pocket, wherein at least a portion of the plurality of contact pads are in electrical contact with the integrated circuit chip. As may be appreciated, the contact pads may be provided for electrical contact interface with a contact chip card reader (e.g. provided in compliance with ISO/IEC Standard 7816).

In some embodiments, the transaction card may further comprise a magnetic stripe (e.g. provided in compliance with ISO/IEC Standard 7811) for storing encoded data associated with the account indicated by or otherwise associated with the visible indicia (e.g. "personalization data"). By way of example, the magnetic stripe may be provided on the second side of the transaction card. In particular, the magnetic stripe may be affixed (e.g. via a cold peel process) to an outward-facing surface of a second film layer of the transaction card. In some implementations, a signature panel may also be affixed (e.g. hot-stamped) to an outward-facing surface of a second film layer. Further, a hologram and/or elite brand mark (e.g. indicative of a specific payment network or card association) may be affixed (e.g. hot-stamped) on an outward-facing surface of a first film layer and/or second film layer of the transaction card.

In conjunction with noted embodiments, the first metallic member may be substantially non-magnetic. In contemplated arrangements, the metallic member may comprise at least one of the following:
   stainless steel;
   palladium;
   platinum;
   gold;
   silver; or,
   tungsten.

In contemplated implementations, the first core layer and the second core layer may each comprise a common polymeric material or different polymeric materials. By way of example, the first core layer and second core layer may comprise the same or different ones of the following:
   polyvinyl chloride;
   polyethylene terephthalate;
   polyethylene terephthalate glycol-modified;
   polyester; and,
   polycarbonate.

Further, in contemplated embodiments, the first film layer and second film layer may comprise a common polymeric material or different polymeric materials. For example, the first film layer and second film layer may comprise the same or different ones of the following:
   polyvinyl chloride;
   polyethylene terephthalate;
   polyethylene terephthalate glycol-modified;
   polyester; and,
   polycarbonate. In embodiments where the first core layer, second core layer, first film layer and/or second film layer is opaque, any such layer(s) may comprise a recycled or renewable polymeric-based material, including for example, a poly-lactic acid material comprising plant-based materials.

In implementations where the first core layer and/or the second core layer is provided with a metal face, the metal face may be provided by a metallized film laminated to the given core layer. By way of example, metallization (e.g. aluminum-based metallization) may be provided on a polymer-based support film (e.g. a support film comprising polyethylene terephthalate, polypropylene, or nylon). In one approach, a continuous metallized surface may be provided on the support film to provide a continuous metal face appearance. In another approach, at least two discontinuous, differently-patterned and non-contacting metallized surfaces may be provided on the support film to combinatively provide a continuous metal face appearance, while also reducing any potential for adverse capacitive and/or electrostatic considerations attendant to the presence of the first metallic member. For example, a first discontinuous metallized surface may be provided in a first pattern of non-contacting areas across the support film, and a second discontinuous metallized surface may be provided in a different, second pattern of non-contacting areas across a transparent, insulating layer (e.g. a polymer-based layer) overlying the first discontinuous metallized surface. By way of example, the first pattern and second pattern may be provided so that spaces between the non-contacting areas of each pattern are overlapped by the non-contacting areas of the other pattern, wherein the first and second discontinuous metallized surfaces combinatively provide a continuous metal face appearance. Additionally, in contemplated embodiments, the first and second inner polymer-based adhesive layers may comprise a thermoset material, a thermoplastic material, combinations thereof, or different such materials. For example, the first and second inner polymer-based adhesive layers may comprise a thermoset cross-linking polymer and thermoplastic composition (e.g. such layers may comprise a urethane or polyurethane-based composition that includes a thermoset, cross-linking polymer). In addition, the first and second outer thermoset layers may comprise a thermoset material, a thermoplastic material, combinations thereof, or different such materials. For example, first and second outer thermoset layers may comprise a thermoset cross-linking polymer and thermoplastic composition (e.g. such layers may comprise a urethane or polyurethane-based composition that includes thermoset, cross-linking polymer).

In some implementations, a weight of the first metallic member may comprise not less than about 40% and not more than about 90% of a total weight of the transaction card, and more particularly, not less than about 60% and not more than about 85% of a total weight of the transaction card. In some arrangements, the total weight of the transaction card may be between about 8 g and 30 g, and more particularly, between about 10 g and 15 g (e.g. when the first metallic member comprises stainless steel).

In contemplated arrangements, the first metallic member and the first core layer and second core layer (e.g. optionally including any metal face provided therewith) may each have corresponding thicknesses that are substantially constant across the entirety of the length and width of the transaction card. Further in that regard, the thickness of the first metallic member may be at least 1.5 times greater than the thickness of the first core layer and/or at least 1.5 times greater than the thickness of the second core layer. For example, in some implementations, the thickness of the first metallic member may be 2 to 3 times greater than a thickness of the first core layer and/or a thickness of the second core layer. In some arrangements, the thickness of the first core layer and the thickness of the second core layer may be substantially equal. A total thickness of the transaction card across the lateral extent thereof may be between about 0.027 in. to 0.033 in. (0.686 mm to 0.838 mm), and where an integrated circuit chip is included, preferably within a range of about 0.030 in. to 0.033 in (0.762 mm to 0.838 mm).

In conjunction with the first aspect, a method embodiment is provided for producing a transaction card having a length and width (e.g. a length, width and thickness in compliance with ISO/IEC Standard 7810), and includes printing on a side of a first core layer (e.g. a transparent or opaque first core layer), and after the printing, interconnecting the first core layer and a second core layer to opposing sides of a first metallic member, wherein the first metallic member and the first and second core layers each extend from edge-to-edge across the length and the width of the transaction card. In one approach, a reverse-printed side of a transparent first core layer may be inward-facing the first metallic member, wherein the printing on the transparent first core layer and any printing provided on a first side of the first metallic member may be visible through a first side of the transaction card. Optionally, the second core layer may be transparent, and the printing may include reverse-printing on an inward-facing side of the second core layer prior to the interconnecting step, wherein the printing on the second core layer and any printing provided on a second side of the first metallic member may be visible through a second side of the transaction card.

In another approach, the first core layer and/or second core layer may be opaque, wherein forward printing may be provided on an outward-facing side of the first core layer and/or second core layer. In conjunction with such approach, a metal face may be provided on an outward-facing side of the first core layer and/or a metal face may be provided on an outward-facing side of the second core layer, wherein said printing may include printing on the metal face provided with the first core layer and/or the metal face provided on the second core layer (e.g. conventional and/or 3D printing with optional transparent, protective printing provided thereupon).

After the interconnecting step, the method may further include pre-personalization of the transaction card and personalization of the transaction card. Pre-personalization may include validating the operability of and/or encoding an issuer key in an integrated circuit chip of the transaction card. Personalization may include defining visible indicia indicative of and/or otherwise relating to an account associated with the transaction card at one of the first side and the opposing second side of the transaction card, and encoding personalization data in an integrated circuit chip and/or magnetic stripe of the transaction card, as discussed herein.

In contemplated arrangements, the first metallic member may define a first area (e.g. across the lateral length and width thereof) that is at least about 80% of a second area defined by the length and width of the transaction card, and in some arrangements the first area may be at least 85% of the second area. In turn, a weight of the first metallic member may comprise not less than about 40% of a total weight of the transaction card, and in some arrangements, not less than about 60% of a total weight of the transaction card.

The printing provided on the first core layer and/or the second core layer may comprise one or more of graphics (e.g. a pictorial scene, a logo, a photo, etc.), human-readable characters (e.g. numbers, letters, and/or representations thereof), and/or machine-readable markings (e.g. a bar code, a multi-dimensional matrix code, etc.). In one arrangement, printing may be provided on the first core layer to present at least a first type of information, and printing may be provided on a second core layer to provide at least a second type of information that is different than the first type of information.

In some embodiments, the interconnecting step may include disposing a first inner polymer-based adhesive layer (e.g. a thermoplastic layer, a thermosetting resin layer, or a layer comprising a thermoplastic and thermoset, cross-linking polymer) between a first side of the first metallic member and the inward-facing side of the first core layer, in direct contact with the inward-facing side of the first core layer and printing provided thereupon. Further, the interconnecting may include disposing a second inner polymer-based adhesive layer (e.g. a thermoplastic layer, a thermosetting resin layer, or a layer comprising a thermoplastic and thermoset, cross-linking polymer) between a second side of the first metallic member and the inward-facing side of the second core layer, in direct contact with the inward-facing side of the second core layer and any printing provided thereon. The first inner polymer-based adhesive layer and/or second inner polymer-based adhesive layer may be transparent to facilitate viewing of the first side of the metallic member and/or second side of the first metallic member, respectively. In some arrangements, the interconnecting may further comprise activating the first inner polymer-based adhesive layer and the second inner polymer-based adhesive layer in a single operation. For example, in one approach, the activating may include applying heat and pressure to an outward-facing side of the first core layer and to an outward facing side of the second core layer.

In some embodiments, the interconnecting may include attaching a transparent first film layer (e.g. a polymer-based layer) to an outward-facing side of the first core layer and a second film layer (e.g. a polymer-based and optionally transparent layer) to an outward-facing side of the second core layer in said single operation, wherein the first film layer and the second film layer each extend from edge-to-edge across the length and width of the transaction card. In some arrangements, the attaching may include disposing a transparent outer thermosetting layer (e.g. a thermosetting resin or composition comprising a thermoplastic and thermoset, cross-linking polymer) between an outward-facing side of the first core layer and an inward-facing side of the first film layer, and disposing an optionally transparent, second outer thermosetting layer (e.g. a thermosetting resin or composition comprising a thermoplastic and thermoset, cross-linking polymer) between the outward-facing side of the second and inward-facing side of the second film layer. In turn, the attaching may further include curing the first outer thermosetting layer and second outer thermosetting layer in the same said single operation as the activating referenced above. In that regard, the first metallic member, first and second core layers, and first and second film layers may all be advantageously interconnected together in a single operation in which the first and second inner polymer-based adhesive layers are activated, and the first and second outer polymer-based thermosetting layers are activated, or cured, to yield the desired interconnection of the first metallic member, first and second core layers, and first and second film layers.

In one approach, the activating/curing may include applying heat and pressure to an outward-facing surface of the first film layer and to outward-facing surface of the second film layer, wherein heat is applied to reach a temperature across the multiple material layers (e.g. multiple material layers having a combined thickness within a range of about 0.027 in. to 0.033 in. (0.686 mm to 0.838 mm), and in embodiments where an integrated circuit chip is to be subsequently included, preferably within a range of about 0.030 in. to 0.033 in. (0.762 mm to 0.838 mm)) of at least about 240° Fahrenheit and no more than, and in some arrangements less than, about 270° Fahrenheit. For example, in a lamination process, a lamination device may utilize a set temperature sufficient to yield material temperatures across the multiple layers within the noted range (e.g. a set temperature of about 310° F.). Following the heating, the interconnected layers may be cooled, e.g. via cooling provided by another lamination device.

In contemplated embodiments, the heat applied during the interconnecting step may be provided to heat the multiple material layers (e.g. multiple material layers having a combined thickness within a range of about 0.027 in. to 0.033 in. (0.686 mm to 0.838 mm), and in embodiments where an integrated circuit chip is to be subsequently included, preferably within a range of about 0.030 in. to 0.033 in. (0.762 mm to 0.838 mm)) above the activation temperatures of the first and second inner polymer-based adhesive layers and above the activation, or curing, temperatures of the first and second outer polymer-based thermosetting layers, and below the softening temperatures of the first and second core layers and first and second film layers. As noted, a material temperature across the multiple material layers of at least about 240° Fahrenheit and no more than, or less than, about 270° Fahrenheit may be utilized.

In one example for interconnecting the multiple material layers, the multiple material layers may be located in a heating lamination device having a set temperature of about 310° F., and applying a pressure of about 255 psi, for a first time period. Thereafter, the multiple material layers may be located in a cooling lamination device having a set temperature of about 58° F., and applying a pressure that initiates at about 255 psi and increases to about 410 psi over a second time period.

In contemplated embodiments, the visible indicia may be defined by at least one of laser engraving, ink jet printing and thermo-printing. In particular, the defining may include laser engraving the visible indicia in a first film layer that comprises a laser reactive material. For example, the first film layer may comprise a polymer-based material (e.g. a clear polyvinylchloride over laminate) having laser reactive particles dispersed therein that change from being transparent to an opaque color upon laser reaction. When the visible indicia is defined by any of laser engraving, ink jet printing and thermo-printing, a carbon containing ink may be utilized for printing on the first core layer and/or second core layer. Alternatively, in laser engraving embodiments, carbonless ink may be utilized for printing on the first core layer and/or second core layer.

In embodiments, after the interconnecting step and prior to the defining step, the method may further include forming a pocket that extends in to the transaction card from the first side, wherein the pocket extends completely through the first core layer and the metallic member. In turn, the method may also include locating an integrated circuit chip and a plurality of contact pads within the pocket (e.g. the contact pads may be provided for electrical contact interface with a contact chip card reader in compliance with ISO/IEC Standard 7816). After the locating and any prepersonalization procedures (e.g. procedures to confirm desired chip attributes and/or to encode an issuer key), and as part of personalization of the transaction card, the method may include encoding the integrated circuit chip to store data associated with the account indicated by or otherwise associated with the visible indicia (e.g. data indicative of or otherwise corresponding with a given payment account number, a personal identification number, etc.).

In some implementations, prior to the interconnecting step and printing step, the method may further include providing a metal face on an outward-facing side of the first core layer and/or providing a metal face on an outward-facing side of the second core layer. Such providing may include adhering, or laminating, a metallized film to the given core layer, as otherwise described herein. In some embodiments, the providing of and printing upon a given metal face may be completed in a single, continuous automated operation.

In some embodiments, prior to the interconnecting step, the method may further comprise affixing a magnetic stripe (e.g. provided in compliance with ISO/IEC Standard 7811) to one of the first side and the second side of the transaction card (e.g. on an outward-facing side of a second film layer). In turn, after the affixing and interconnecting, and as part of personalization of the transaction card, the method may further include encoding the magnetic stripe to store data associated with the account indicated by or otherwise associated with the visible indicia. In some arrangements, after the interconnecting and prior to card personalization, the method may further include affixing one or more of a signature panel, hologram and/or elite brand mark on an outward-facing surface of the transaction card (e.g. via hot-stamping on an outside surface of a first film layer and/or a second film layer).

In conjunction with the first aspect and contemplated method embodiments, the transaction card may be one of a plurality of transaction cards (e.g. defined by a corresponding plurality of card bodies), wherein the method includes imprinting at each of a plurality of different locations on at least one side of a transparent first core sheet (e.g. an inward-facing side and/or an outward-facing side), and optionally at each of a plurality of different locations on at least one side of a second core sheet (e.g. an inward-facing side and/or an outward-facing side), to complete the above-referenced printing step for each of the plurality of transaction cards. Further, the method may include connecting the first core sheet and the second core sheet to opposing first and second sides of a first metallic sheet, e.g. with a printed side of the first core sheet inward-facing the first metallic sheet and/or with an optionally-printed side of the second core sheet inward-facing the first metallic sheet, as part of a multi-sheet assembly to complete the above-referenced interconnecting step for each of the plurality of transaction cards. In turn, the method may include separating the multi-sheet assembly into a plurality of card bodies in corresponding relation to the plurality of transaction cards.

The first core sheet and second core sheet may comprise the same or a different polymer-based material, and together with the first metallic sheet, may extend continuously across the lateral extent of a plurality of sheet regions of the multi-sheet assembly from which the plurality of card bodies are separated. Optionally, the first core sheet and/or second core sheet may be provided with a corresponding metal face (e.g. provided by a corresponding metallized film sheet laminated to the given core sheet) that extends continuously across the lateral extent of a plurality of sheet regions of the multi-sheet assembly from which the plurality of card bodies are separated.

The connecting of the multi-sheet assembly may comprise securing the inward-facing side of the first core sheet and an inward-facing side of the second core sheet together at a first plurality of spaced locations along at least two opposing and/or adjacent, peripheral side edge portions of the first core sheet and the second core sheet to locate the first core sheet and the second core sheet in predetermined registered relation to one another with an accessible space therebetween. In turn, the method may include inserting the first metallic sheet in to the accessible space from an edge opening thereof. In some arrangements, the securing step may include spot-welding (e.g. thermal spot welding, ultrasonic spot welding, laser spot welding, etc.) the first core sheet and the second core sheet together at the first plurality of spaced locations.

In some implementations, prior to inserting the first metallic sheet in to the accessible space and separating the multi-sheet assembly into card bodies, the connecting may further include adjoining an inward-facing side of a transparent first film sheet to an outward-facing side of the first core sheet, and an inward-facing side of a second film sheet to an outward-facing side of the second core sheet, as part of the multi-sheet assembly to complete the above-referenced attaching step for each of the plurality of transaction cards. The first film sheet and second film sheet may comprise the same or a different polymer-based material and may extend continuously across the lateral extent of the plurality of corresponding sheet regions of the multi-sheet assembly from which the plurality of card bodies are separated. Further, prior to the connecting, the method may further include affixing one or a plurality of rows of magnetic stripe lines across a length of an outward-facing side of the second film sheet in predetermined relation to the plurality of corresponding sheet regions of the multi-sheet assembly from which the plurality of card bodies are separated. In that regard, the magnetic stripe line(s) may be affixed using an adhesive (e.g. a thermal adhesive).

The adjoining of the first film sheet may include securing by spot welding (e.g. thermal spot welding, ultrasonic spot welding, laser spot welding, etc.) the inward-facing side of the first film sheet and the outward-facing side of the first core sheet at a second plurality of spaced locations along at least two opposing and/or adjacent, peripheral side edge portions of the first film sheet and the first core sheet to locate the first film sheet and the first core sheet in predetermined registered relation to one another, wherein the second plurality of spaced locations correspond with the first plurality of spaced locations noted above. Similarly, the adjoining of the second film sheet may also include securing by spot-welding (e.g. thermal spot-welding, ultrasonic spot welding, laser spot welding, etc.) the inward-facing side of the second film sheet and the outward-facing side of the second core sheet at a third plurality of spaced locations along at least two opposing and/or adjacent, peripheral side edge portions of the second film sheet and the second core sheet to locate the second film sheet and the second cores sheet in predetermined registered relation to one another, wherein the third plurality of spaced locations also correspond with the first plurality of spaced locations noted above. In one approach, each of the securing steps referenced above may be completed by spot-welding (e.g. thermal spot welding, ultrasonic spot welding, laser spot welding, etc.) once at each of the corresponding plurality of spaced locations.

In some embodiments, the step of connecting the first core sheet and second core sheet to opposing sides of the first metallic sheet may further include providing a first inner polymer-based adhesive sheet-like layer between the first side of the first metallic sheet and the inward-facing side of the first core sheet, and a second inner polymer-based adhesive sheet-like layer coating between the second side of the first metallic sheet and the inward-facing side of the second core sheet, as part of the multi-sheet assembly. In one approach, a polymer-based adhesive (e.g. a thermoplastic and/or thermosetting coating) may be coated on and across the first side and/or second side of the metallic sheet. In another approach, a polymer-based adhesive (e.g. a thermoplastic and/or thermosetting coating) may be coated on and across the inward-facing side of the first core sheet and/or second core sheet. In yet another approach, a thermoplastic material may be coated on and across each side of a polymer-based carrier layer (e.g. a layer comprising polyethylene terephthalate) to define a carrier sheet, wherein a first carrier sheet is provided between the metallic member and the inward-facing side of the first core sheet and a second carrier sheet is provided between the first metallic sheet and the inward-facing side of the second core sheet as part of the multi-sheet assembly.

Further, the step of adjoining the first and second film sheets to the first and second core sheets, respectively, may further include providing a first outer thermosetting sheet-like layer between the outward-facing side of the first core sheet and the inward-facing side of the first film sheet, and a second outer thermosetting sheet-like layer between the outward-facing side of the second core sheet and the inward-facing side of the second film sheet, as part of the multi-sheet assembly. In one approach, the first and second outer thermosetting sheet-like layers may be coatings applied to and across the inward-facing sides of the first and second film sheets, respectively.

In turn, prior to the separation of card bodies from of the multi-sheet assembly, the connecting step may be completed by activating the first and second inner polymer-based adhesive sheet-like layers, and curing the first and second outer thermosetting sheet-like layers, together in a single operation, wherein the entire multi-sheet assembly is interconnected together. In contemplated embodiments, the activating/curing may include applying heat and pressure to an outward-facing surface of the first film sheet and to outward-facing surface of the second film sheet, wherein heat is applied to achieve a temperature across the thickness of the multi-sheet assembly (e.g. a thickness of between about 0.027 in. to 0.033 in. (0.686 mm to 0.838 mm), and in embodiments where an integrated circuit chip is to be subsequently included, preferably within a range of about 0.030 in. to 0.033 in. (0.762 mm to 0.838 mm)) within a range of at least about 240° Fahrenheit and no more than, or less than, about 270° Fahrenheit. Following the activating/curing, the multi-sheet assembly may be cooled.

In one example, for interconnecting the multi-sheet assembly, the multi-sheet assembly may be located in a heating lamination device having a set temperature of about 310° F., and applying a pressure of about 255 psi, for a first time period. In turn, the multi-sheet assembly may be located in a cooling lamination device having a set temperature of about 58° F., and applying a pressure that initiates at about 255 psi and increases to about 410 psi over a second time period.

In one approach, after the connecting and prior to the separating, the method may further include, defining a plurality of pockets (e.g. completed or partially completed pockets) in the interconnected multi-sheet assembly in one or a plurality of rows across a length of the interconnected multi-sheet assembly in corresponding relation to said plurality of sheet regions of the multi-sheet assembly from which the plurality of card bodies are separated to provide a pocket for each of the corresponding plurality of card bodies (i.e. in corresponding relation to the plurality of transaction cards), wherein each of the plurality of pockets extend inward from a first side of the interconnected multi-sheet assembly and entirely through the first metallic sheet.

In another approach, the method may further include, after the separating, defining a pocket in each of the card bodies. For example, for each card body, a two-step milling process may include milling a first portion of the pocket that extends through the corresponding metallic member, and milling a second portion of the pocket that enlarges an open end of the pocket. As may be appreciated, the two-step milling process may be reversed to mill the first and second portions in reverse order.

After the separating step, the method may further include completing separately for each of the plurality of card bodies, in corresponding relation to the plurality of transaction cards, the following:
   an optional enlarging step to enlarge a portion of the corresponding card pocket;
   the above-referenced optional step of affixing a signature panel, hologram and/or elite brand mark;
   the above-referenced locating step (e.g. locating an integrated circuit chip and contact pads in the corresponding card pocket); and, the above-referenced personalization steps (e.g. the defining of visible indicia step and the encoding of the integrated circuit chip and/or magnetic stripe step(s) with personalization data).

In a second aspect, a transaction card having a length and width (e.g. a length, width and thickness in compliance with ISO/IEC Standard 7810) includes a second metallic member having an opening therethrough and extending from edge-to-edge about the length and width of the transaction card, and a non-metallic inlay (e.g. a polymer-based inlay) disposed within the opening of the second metallic member. In that regard, the second metallic member may define a frame that extends about the entirety of the inlay. The transaction card may further include an inlay antenna supportably interconnected to the inlay, and a first core layer interconnected to a first side of the second metallic member and a first side of the inlay layer, and extending from edge-to-edge across a length and width of the transaction card. Optionally, the transaction card may further include a second core layer interconnected to a second side of the second metallic member and a second side of the inlay, and extending from edge-to-edge across the length and the width of the transaction card (e.g. a polymer-based layer).

The transaction card may also include visible indicia indicative of and/or otherwise relating to an account associated with the transaction card (e.g. "personalization data"). By way of example, such visible indicia may comprise human-readable characters and/or machine-readable markings indicative of an account number and/or otherwise relating to a unique account to be administered by an issuer of the transaction card (e.g. a payment account administered by a financial institution such as a bank or credit union). In some arrangements, the visible indicia may be provided at an outside surface of a first side and/or outside surface of a second side of the transaction card without defining raised surface portions (e.g. free from embossing). In other arrangements, the visible indicia may be provided via embossing in a card region corresponding with the non-metallic inlay of the transaction card.

In contemplated implementations, the transaction card may further include a pocket extending into the transaction card from the first side thereof, wherein the pocket extends completely through the first core layer and in to at least a portion of the inlay (e.g. at least a portion of a thickness of the inlay). In some embodiments, the pocket may extend completely through the first core layer and inlay, and in to a portion of the second core layer (e.g. a portion of a thickness of the second core layer). The transaction card may further include an integrated circuit chip for storing data associated with the account indicated by or otherwise associated with the visible indicia (e.g. "personalization data"), wherein the integrated circuit chip is disposed in the pocket to couple with the inlay antenna for contactless RF signal interface with a non-contact chip card reader (e.g. in compliance with ISO/IEC Standard 14443), free from electrical interconnection with the second metallic member.

In conjunction with such embodiments, the transaction card may further include a plurality of contact pads located and exposed within the pocket, wherein at least a portion of the plurality of contact pads are in electrical contact with the integrated circuit chip. The contact pads may be provided for contact interface between the integrated circuit chip and a contact chip card reader (e.g. in compliance with ISO/IEC Standard 7816).

In one approach, the inlay antenna may include at least one or a plurality of metallic outer loops for contactless RF signal interface with a non-contact chip card reader, and interconnected thereto, at least one or a plurality of metallic inner loops for non-contact coupling (e.g. inductive coupling) with another antenna electrically interconnected to the integrated circuit chip. In the later regard, an integrated circuit chip module may comprise an integrated circuit chip and electrically-interconnected antenna supportably mounted to a first side of a non-conductive substrate, and a plurality of contact pads supportably interconnected to a second side of the substrate and electrically interconnected to the integrated circuit chip through the substrate. In turn, the integrated circuit chip module may be disposed within the pocket, with the first side of the substrate facing inward and the electrically-interconnected antenna disposed in at least partially overlapping, spaced relation to the inner loops of the inlay antenna for coupling therebetween to provide contactless interface between the integrated circuit chip and a non-contact chip card reader.

In some embodiments, the opening through the second metallic member may define a first area (e.g. an area defined by and laterally across the opening) within a range of about 20% to about 70% of a second area defined by the length and width of the transaction card. In some arrangements, the first area may be at least about 40% of the second area, and preferably within a range of about 40% to about 70% of the second area. In one approach, the first area may be substantially rectangular to receive a substantially rectangular inlay. In another characterization, the second metallic member may define a third area (i.e. an area defined by and laterally across the second metallic member, i.e. excluding the opening), and the inlay may define a fourth area (i.e. an area defined by and laterally across the inlay), wherein and the fourth area is at least about 1.5 times greater than the third area.

In contemplated implementations, the inlay may include a first inlay layer and a second inlay layer interconnected to the first inlay layer, wherein the inlay antenna is disposed between at least a portion of the first inlay layer (e.g. a portion of a thickness thereof) and at least a portion of the second inlay layer (e.g. a portion of a thickness thereof). In one approach, the inlay antenna may be disposed on a non-conductive substrate, wherein the substrate and inlay antenna are disposed between opposing sides of the first inlay layer and the second inlay layer. For example, the inlay antenna may be provided on a side of a substrate (e.g. via metal plating or deposition/etching or via an adhesive), together with one or more pairs of spaced capacitor plates provided on opposing sides of the substrate (e.g. via metal plating or deposition/etching or via an adhesive) for resonant frequency tuning.

In another approach, the inlay antenna may be at least partially embedded in one side of the two opposing sides of the first inlay layer and said second inlay layer. For example, the inlay antenna may comprise a metal wire that is partially embedded on one side of the first inlay layer (e.g. via ultrasonic material displacement with metal wire placement), together with one or more capacitively coupled wire portions for resonant frequency tuning.

In some arrangements, the inlay antenna may be disposed within a middle portion of an overall thickness of the transaction card (e.g. within a middle portion having a centered thickness of no more than about 20%, and preferably no more than about 10%, of the overall thickness of the transaction card). In one approach, the first inlay layer and second inlay layer may have substantially equal thicknesses, with the inlay antenna disposed on a substrate therebetween.

In contemplated implementations, printing may be provided on the first core layer and/or second core layer for viewing from a first side and/or second side of the transaction, respectively. In one approach, the first core layer and/or second core layer may be opaque, wherein the printing is provided on an outward facing side of such layer(s). In another approach, the first core layer and/or second core layer may be transparent, wherein printing may be providing on an inward-facing side of such layer(s) by reverse printing and/or on an outward-facing side of such layer(s) by forward printing. In yet another approach, a metal face may be provided on an outward-facing side of the first core layer and/or second core layer (e.g. a metal face defined by a continuous metallized surface or combinatively defined by at least two discontinuous, differently-patterned and non-contacting metallized surfaces), and may include forward printing on an outward-facing side of the metal face, wherein a continuous metal face appearance and the printing are visible from the first side and/or second side of the transaction card.

In any case, the printing provided on the first core layer and/or second core layer may comprise one or more of graphics (e.g. a pictorial scene, or logo, or photo, etc.), human-readable characters (e.g. numbers, letters and/or representations thereof), and/or machine-readable markings (e.g. a barcode, a multi-dimensional matrix code, etc.). In one arrangement, printing may be provided on the first core layer to present at least a first type of information, and printing may be provided on the second core layer to provide at least a second type of information different than the first type of information.

In contemplated embodiments, peripheral edges of each of the second metallic member and the first and second core layers may extend continuously about the entire periphery of a transaction card. In turn, the peripheral edges of the second metallic member may be visible, thereby yielding an appearance associated with a premium transaction card.

In some implementations, a first inner polymer-based adhesive sheet layer (e.g. a thermoset and/or thermoplastic containing layer) may be disposed between and interconnect an outward-facing side of the second metallic member with inlay and the inward-facing side of the first core layer. In such implementations, the first inner polymer-based adhesive layer may be opaque or transparent.

Similarly, a second inner polymer-based adhesive layer (e.g. a thermoset and/or thermoplastic containing layer) may be disposed between and interconnect an outward-facing side of the second metallic member with inlay and the inward-facing side of the second core layer. In such implementations, the second inner polymer-based adhesive layer may be opaque or transparent.

In conjunction with some embodiments, the transaction card may also include a first film layer (e.g. a polymer-based layer) attached to an outward-facing side of the first core layer and extending from edge-to-edge across the length and width of the transaction card. The first film layer may be transparent to facilitate viewing of any printing on the first core layer through the first side of the transaction card. In contemplated arrangements, all or at least a portion of the visible indicia may be defined at an outward-facing surface of the first film layer (e.g. by at least one of laser engraving, ink jet printing and thermal printing). By way of particular example, visible indicia may be defined at the outward-facing surface of the first film layer by laser engraving, wherein the first film layer may comprise a polymer-based material having a laser reactive material dispersed therein (e.g. carbon particles). When the visible indicia is defined by any of laser engraving, ink jet printing and thermo-printing, a carbon containing ink may be utilized for printing on the first core layer and/or second core layer. Alternatively, in laser engraving embodiments, carbonless ink may be utilized for printing on the first core layer and/or second core layer.

Similarly, the transaction card may include a second outer film layer (e.g. a polymer-based layer) attached to an outward-facing side of the second core layer and extending from edge-to-edge across the length and the width of the transaction card. In such implementations, the second film layer may be transparent to facilitate viewing of any printing on the second core layer through the second side of the transaction card.

Where a first and/or second film layer is included, a corresponding first outer thermoset layer (e.g. a thermoset coating applied to an inward-facing side of the first film layer or applied to the outward-facing side of the first core layer) and/or second outer thermoset layer (e.g. a thermoset coating applied to an inward-facing side of the second film layer or applied to the outward-facing side of the second core layer) may be disposed to attach the outward-facing side of the first core layer and the inward-facing side of the first film layer and/or to attach the outward-facing side of the second core layer and an inward-facing side of the second outer film layer. As may be appreciated, the first outer thermoset layer and/or second outer thermoset layer may be transparent to facilitate viewing of printing on the first core layer and/or second core layer through first side and/or second side of the transaction card.

In various embodiments, the first and second outer thermoset layers and/or the first and second inner polymer-based adhesive layers may each comprise a thermoset cross-linking polymer and thermoplastic composition. For example, such layers may comprise a urethane-based or polyurethane-based composition that includes a thermoset, cross-linking polymer.

In some embodiments, the transaction card may further comprise a magnetic stripe (e.g. provided in compliance with ISO/IEC Standard 7811) for storing data associated with the account indicated by or otherwise associated with the visible indicia (e.g. "personalization data"). By way of example, the magnetic stripe may be provided on the second side of the transaction card. In particular, the magnetic stripe may be affixed (e.g. via a cold peel process) to an outward-facing surface of a second film layer of the transaction card. In some implementations, a signature panel may also be affixed (e.g. hot-stamped) to an outward-facing surface of a second film layer. Further, a hologram and/or elite brand mark (e.g. indicative of a specific payment network or card association) may be affixed (e.g. hot-stamped) on an outward-facing surface of a first film layer and/or second film layer of the transaction card.

In conjunction with noted embodiments, the second metallic member may be non-magnetic. In contemplated arrangements, the second metallic member may comprise at least one of the following:

stainless steel;
palladium;
platinum;
gold;
silver; or,
tungsten.

In contemplated implementations, the first core layer and second core layer, and the first inlay layer and second inlay layer, may each comprise a common polymeric material or different polymeric materials. By way of example, the first core layer and second core layer, and the first inlay layer and second inlay layer, may comprise the same or different ones of the following:
  polyvinyl chloride;
  polyethylene terephthalate;
  polyethylene terephthalate glycol-modified;
  polyester; and,
  polycarbonate.

Further, in contemplated embodiments, the first film layer and second film layer may comprise a common polymeric material or different polymeric materials. For example, the first film layer and second film layer may comprise the same or different ones of the following:
  polyvinyl chloride;
  polyethylene terephthalate;
  polyethylene terephthalate glycol-modified;
  polyester; and,
  polycarbonate.

In embodiments where the first core layer, second core layer, first inlay layer, second inlay layer first film layer and/or second film layer is opaque, any such layer(s) may comprise a recycled or renewable polymeric-based material, including for example, a poly-lactic acid material comprising plant-based materials.

In implementations where the first core layer and/or the second core layer is provided with a metal face, the metal face may be provided by a metallized film laminated to the given core layer. By way of example, metallization (e.g. aluminum-based metallization) may be provided on a polymer-based support film (e.g. a support film comprising polyethylene terephthalate, polypropylene, or nylon). In one approach, a continuous metallized surface may be provided on the support film to provide a continuous metal face appearance. In another approach, at least two discontinuous, differently-patterned and non-contacting metallized surfaces may be provided on the support film to combinatively provide a continuous metal face appearance, while also reducing any potential for adverse capacitive and/or electrostatic considerations attendant to the presence of the second metallic member. For example, a first discontinuous metallized surface may be provided in a first pattern of non-contacting areas across the support film, and a second discontinuous metallized surface may be provided in a different, second pattern of non-contacting areas across a transparent, insulating layer (e.g. a polymer-based layer) overlying the first discontinuous metallized surface. By way of example, the first pattern and second pattern may be provided so that spaces between the non-contacting areas of each pattern are overlapped by the non-contacting areas of the other pattern, wherein the first and second discontinuous metallized surfaces combinatively provide a continuous metal face appearance.

Additionally, in contemplated embodiments, the first and second inner polymer-based adhesive layers may comprise a thermoset material, a thermoplastic material, combinations thereof, or different such materials. For example, the first and second inner polymer-based adhesive layers may comprise a thermoset cross-linking polymer and thermoplastic composition (e.g. such layers may comprise a urethane or polyurethane-based composition that includes a thermoset, cross-linking polymer). In addition, the first and second outer thermoset layers may comprise a thermoset material, a thermoplastic material, combinations thereof, or different such materials. For example, first and second outer thermoset layers may comprise a thermoset cross-linking polymer and thermoplastic composition (e.g. such layers may comprise a urethane or polyurethane-based composition that includes thermoset, cross-linking polymer).

In contemplated arrangements, the second metallic member with inlay and the first core layer and second core layer (e.g. optionally including any metal face provided therewith) may each have corresponding thicknesses that are substantially constant across the entirety of the length and width of the transaction card. Further in that regard, the thickness of the second metallic member and inlay may be at least 1.5 times greater than the thickness of the first core layer and/or at least 1.5 times greater than the thickness of the second core layer. For example, in some implementations, the thickness of the second metallic member with inlay may be 2 to 3 times greater than a thickness of the first core layer and/or a thickness of the second core layer. In some arrangements, the thickness of the first core layer and the thickness of the second core layer may be substantially equal. A total thickness of the transaction card across the lateral extent thereof may be between about 0.027 in. to 0.033 in. (0.686 mm to 0.838 mm), and in embodiments where an integrated circuit chip is to be subsequently included, preferably within a range of about 0.030 in. to 0.033 in (0.762 mm to 0.838 mm).

In conjunction with the second aspect, a method embodiment is provided for producing a transaction card having a length and a width (e.g. a length, width and thickness in compliance with ISO/IEC Standard 7810). The method includes disposing a non-metallic inlay (e.g. a polymer-based inlay) within an opening that extends through a second metallic member, wherein the second metallic member extends from edge-to-edge about the length and width of the transaction card, and wherein an inlay antenna is supportably interconnected to the inlay.

In conjunction with the disposing, in one approach the inlay may be press-fit in to the opening of the second metallic member. Additionally, or alternatively, the disposing may include positioning the inlay in the second metallic opening and providing a thermosetting resin to fill or at least partially fill open space between the inlay and second metallic member. In some arrangements, a polymer-based adhesive layer may be adhered to one side of the second metallic member, across the opening, immediately prior to or after the disposing. Further, another polymer-based adhesive layer may be adhered to the opposing side of the second metallic member, across the opening, after the disposing of the inlay in the opening of the second metallic member.

The method embodiment may further include interconnecting, after the disposing, a first core layer to a first side of the second metallic member with inlay, wherein the first core layer extends from edge-to-edge across the length and width of the transaction card. Optionally, the interconnecting may include interconnecting a second core layer to a second side of the second metallic member with inlay, wherein the second core layer extends from edge-to-edge across the length and width of the transaction card.

After the interconnecting, the method may further include pre-personalization of the transaction card and personalization of the transaction card. Pre-personalization may include validating the operability of and/or encoding an issuer key in an integrated circuit chip of the transaction card. Personalization may include defining visible indicia of an account associated with the transaction card (e.g. "personalization data"). By way of example, such visible indicia may comprise human-readable characters and/or machine-readable markings indicative of an account number and/or otherwise relating to a unique account to be administered by an issuer of the transaction card (e.g. a payment account administered by a financial institution such as a bank or credit union). In some arrangements, the visible indicia may be provided at an outside surface of a first side and/or outside surface of a second side of the transaction card without defining raised surface portions (e.g. free from embossing). In other arrangements, the visible indicia may be provided via embossing in a card region corresponding with the non-metallic inlay of the transaction card. Personalization may further include encoding personalization data in an integrated circuit chip and/or magnetic stripe of the transaction card.

Further, the method may include forming a pocket that extends in to the transaction card from a first side thereof, wherein the pocket extends completely through the first core layer and in to at least a portion of the inlay. In some embodiments, the pocket may extend completely through the first core layer and inlay, and in to a portion of the second core layer (e.g. a portion of thickness of the second core layer). Additionally, after the forming, the method may include locating an integrated circuit chip in the pocket to couple with the inlay antenna for contactless interface with a non-contact chip card reader (e.g. in compliance with ISO/IEC Standard 14443).

In contemplated implementations, the locating may further include locating another antenna within the pocket in electrical connection with the integrated circuit chip (e.g. as part of an IC chip module as described above) for coupling with the inlay antenna for contactless interface with a non-contact chip card reader. Additionally, the locating may include locating a plurality of contact pads within the pocket in electrical connection with integrated circuit chip (e.g. as part of an IC chip module as described above) for contact interfaced with the chip card reader (e.g. in compliance with ISO/IEC Standard 7816).

In some embodiments, the method may further include printing on a side at the first core layer and/or second core layer prior to the interconnecting. In one approach, the printing may be provided on an outward-facing side of an opaque first core layer and/or on an outside outward-facing side of an opaque second core layer. In conjunction with such approach, a metal face may be provided on an outward-facing side of the first core layer and/or a metal face may be provided on an outward-facing side of the second core layer, wherein the printing step may include printing on the metal face provided with the first core layer and/or the metal face provided on the second core layer (e.g. conventional and/or 3D printing with optional transparent, protective printing provided thereupon). The printing may comprise one or more graphics, human-readable characters, and/or machine-readable markings, as otherwise described herein.

In some implementations, prior to the interconnecting step and printing step, the method may further include providing a metal face on an outward-facing side of the first core layer and/or providing a metal face on an outward-facing side of the second core layer. Such providing may include adhering, or laminating, a metallized film to the given core layer, as otherwise described herein. In some embodiments, the providing of and printing upon a given metal face may be completed in a single, continuous automated operation.

In some embodiments, the opening through the second metallic member may define a first area (e.g. an area defined by and laterally across the opening) within a range of about 20% to about 70% of a second area defined by the length and width of the transaction card. In some arrangements, the first area may be at least about 40% of the second area, and preferably within a range of about 40% to about 70% of the second area. In one approach, the first area may be substantially rectangular to receive a substantially rectangular inlay. In another characterization, the second metallic member may define a third area (i.e. an area defined by and laterally across the second metallic member), and the inlay may define a fourth area (i.e. an area defined by and laterally across the inlay), wherein and the fourth area is at least about 1.5 times greater than the fourth area.

In contemplated implementations, the inlay may include a first inlay layer and a second inlay layer interconnected to the first inlay layer, wherein the inlay antenna is disposed between at least a portion of the first inlay layer (e.g. a portion of a thickness thereof) and at least a portion of the second inlay layer (e.g. a portion of a thickness thereof). In one approach, the inlay antenna may be disposed on a non-conductive substrate, wherein the substrate and inlay antenna are disposed between opposing sides of the first inlay layer and the second inlay layer. For example, the inlay antenna may be provided on a side of a substrate (e.g. via metal plating or deposition/etching or via an adhesive), together with one or more pairs of spaced capacitor plates provided on opposing sides of the substrate (e.g. via metal plating or deposition/etching or via an adhesive) for resonant frequency tuning.

In another approach, the inlay antenna may be at least partially embedded in one side of the two opposing sides of the first inlay layer and said second inlay layer. For example, the inlay antenna may comprise a metal wire partially embedded on one side of the first inlay layer (e.g. via ultrasonic material displacement and metal wire placement), together with one or more capacitively coupled wire portions for resonant frequency tuning.

In some arrangements, the inlay antenna may be disposed within a middle portion of an overall thickness of the transaction card (e.g. within a middle portion having a centered thickness of no more than 20%, and preferably no more than about 10%, of the overall thickness of the transaction card). In one approach, the first inlay layer and second inlay layer may have substantially equal thicknesses, with the inlay antenna disposed on a substrate therebetween.

In some embodiments, the interconnecting step may include disposing a first inner polymer-based adhesive layer (e.g. a thermoplastic layer, a thermosetting resin layer, or a layer comprising a thermoplastic and thermoset, cross-linking polymer) between a first outward-facing side of the second metallic member with inlay and an inward-facing side of the first core layer. Such disposing may optionally comprise adhering the first inner polymer-based adhesive layer to the second metallic member in conjunction with positioning the inlay in the opening, as noted above. Further, the interconnecting may include disposing a second inner polymer-based adhesive layer (e.g. a thermoplastic layer, a thermosetting resin layer, or a layer comprising a thermoplastic and thermoset, cross-linking polymer) between a second outward-facing side of the second metallic member with inlay and an inward-facing side of the second core layer. Such disposing may optionally comprise adhering the second inner polymer-based adhesive layer to the second metallic member in conjunction with positioning of the inlay in the opening, as noted above.

In some arrangements, the interconnecting may further comprise activating the first inner polymer-based adhesive layer and the second inner polymer-based adhesive layer in a second single operation. For example, in one approach, the activating may include applying heat and pressure to an outward-facing side of the first core layer and to an outward facing side of the second core layer.

In some embodiments, the interconnecting may include attaching a transparent first film layer (e.g. a polymer-based layer) to an outward-facing side of the first core layer and a second film layer (e.g. a polymer-based and optionally transparent layer) to an outward-facing side of the second core layer, wherein the first film layer and the second film layer each extend from edge-to-edge across the length and width of the transaction card. In some arrangements, the attaching may include disposing a transparent outer thermosetting layer (e.g. a thermosetting resin or composition comprising a thermoplastic and thermoset, cross-linking polymer) between an outward-facing side of the first core layer and an inward-facing side of the first film layer, and disposing an optionally transparent, second outer thermosetting layer (e.g. a thermosetting resin or composition comprising a thermoplastic and thermoset, cross-linking polymer) between the outward-facing side of the second core layer and inward-facing side of the second film layer. In turn, the attaching may further include curing the first outer thermosetting layer and second outer thermosetting layer in the same single operation as the activating referenced above. In that regard, the second metallic member with inlay, first and second core layers, and first and second film layers may all be advantageously interconnected together in a single operation in which the first and second inner polymer-based adhesive layers are activated, and the first and second outer polymer-based thermosetting layers are activated, or cured, to yield the desired interconnection of second metallic member, first and second core layers, and first and second film layers.

In one approach, the activating/curing may include applying heat and pressure to an outward-facing surface of the first film layer and to outward-facing surface of the second film layer, wherein heat is applied to reach a temperature across the multiple material layers (e.g. multiple layers having a combined thickness of about 0.027 in. to 0.033 in (0.686 mm to 0.838 mm), and in embodiments where an integrated circuit chip is to be subsequently included, preferably within a range of about 0.030 in. to 0.033 in. (0.762 mm to 0.838 mm)) within a range of at least about 240° Fahrenheit and no more than, and in some arrangements less than, about 270° Fahrenheit. For example, in a lamination process, a lamination device may utilize a set temperature sufficient to yield material temperatures across the multiple layers within the noted range (e.g. a set temperature of about 310° F.). Following the heating, the interconnected layers may be cooled, e.g. via cooling provided by another lamination device.

In contemplated embodiments, the heat applied during the interconnecting step may be provided to heat the multiple material layers (e.g. multiple layers having a combined thickness of about 0.027 in. to 0.033 in (0.686 mm to 0.838 mm), and in embodiments where an integrated circuit chip is to be subsequently included, preferably within a range of about 0.030 in. to 0.033 in. (0.762 mm to 0.838 mm)) above the activation temperatures of the first and second inner polymer-based adhesive layers and above the activation, or curing, temperatures of the first and second outer polymer-based thermosetting layers, and below the softening temperatures of the first and second core layers and first and second film layers. As noted, a material temperature across the multiple layers of at least about 240° Fahrenheit and no more than, or less than, about 270° Fahrenheit may be utilized.

In one example for interconnecting the multiple material layers, the multiple layers may be located in a heating lamination devices having a set temperature of about 310° F., and applying a pressure of about 255 psi, for a first time period. In turn, the multiple material layers may be located in a cooling lamination device having a set temperature of about 58° F., and applying a pressure that initiates at about 255 psi and increases to about 410 psi over a second time period.

In contemplated embodiments, the visible indicia may be defined by at least one of laser engraving, ink jet printing and thermo-printing. In particular, the defining may include laser engraving the visible indicia in a first film layer that comprises a laser reactive material. For example, the first film layer may comprise a polymer-based material (e.g. a clear polyvinylchloride over laminate) having laser reactive particles dispersed therein, e.g. particles that change from transparent to an opaque color upon laser reaction (e.g. carbon particles). When the visible indicia is defined by any of laser engraving, ink jet printing and thermo-printing, a carbon containing ink may be utilized for printing on the first core layer and/or second core layer. Alternatively, in laser engraving embodiments, carbonless ink may be utilized for printing on the first core layer and/or second core layer.

In conjunction with the first aspect and contemplated method embodiments, the transaction card may be one of a plurality of transaction cards (e.g. defined by a corresponding plurality of card bodies), and the method may further comprise perforating a second metallic sheet at a plurality of predetermined locations to define a plurality of openings through the metallic sheet, and inserting a different one of the plurality of inlays (e.g. identical inlays as described above) into each of the plurality of openings to complete the disposing step for each of a plurality of transaction cards. The method may further include connecting a first core sheet and a second core sheet to opposing first and second sides of the second metallic sheet with inlays, as part of a multi-sheet assembly, to complete the above-referenced interconnecting step for each of the plurality of transaction cards. In turn, the method may include separating the multi-sheet assembly into a plurality of card bodies in corresponding relation to the plurality of transaction cards.

The first core sheet and second core sheet may comprise the same or a different polymer-based material, and together with the second metallic sheet, may extend continuously across the lateral extent of a plurality of corresponding sheet regions of the multi-sheet assembly from which the plurality of card bodies are separated. Optionally, the first core sheet and/or second core sheet may be provided with a corresponding metal face (e.g. provided by a corresponding metallized film sheet laminated to the given core sheet) that extends continuously across the lateral extent of a plurality of sheet regions of the multi-sheet assembly from which the plurality of card bodies are separated.

The connecting of the multi-sheet assembly may comprise securing the inward-facing side of the first core sheet and an inward-facing side of the second core sheet together at a first plurality of spaced locations along at least two opposing and/or adjacent, peripheral side edge portions of the first core sheet and the second core sheet to locate the first core sheet and the second core sheet in predetermined registered relation to one another with an accessible space therebetween. In turn, the method may include inserting the second metallic sheet in to the accessible space from an edge opening thereof. In some arrangements, the securing step may include spot-welding (e.g. thermal spot welding, ultrasonic spot welding, laser spot welding, etc.) the first core sheet and the second core sheet together at the first plurality of spaced locations.

In some implementations, prior to inserting the second metallic sheet in to the accessible space and separating the multi-sheet assembly into card bodies, the connecting may further include adjoining an inward-facing side of a transparent first film sheet to an outward-facing side of the first core sheet, and an inward-facing side of a second film sheet to an outward-facing side of the second core sheet, as part of the multi-sheet assembly to complete the above-referenced attaching step for each of the plurality of transaction cards. The first film sheet and second film sheet may comprise the same or a different polymer-based material and may extend continuously across the lateral extent of the plurality of corresponding sheet regions of the multi-sheet assembly from which the plurality of card bodies are separated. Further, prior to the connecting, the method may further include affixing one or a plurality of rows of magnetic stripe lines across a length of an outward-facing side of the second film sheet in predetermined relation to the plurality of corresponding sheet regions of the multi-sheet assembly for each of the plurality of transaction cards. In that regard, the magnetic stripe line(s) may be affixed using an adhesive (e.g. a thermal adhesive).

The adjoining of the first film sheet may include securing via spot welding (e.g. via thermal spot welding, ultrasonic spot welding, laser spot welding, etc.) the inward-facing side of the first film sheet and the outward-facing side of the first core sheet at a second plurality of spaced locations along at least two opposing and/or adjacent, peripheral side edge portions of the first film sheet and the first core sheet to locate the first film sheet and the first core sheet in predetermined registered relation to one another, wherein the second plurality of spaced locations correspond with the first plurality of spaced locations noted above. Similarly, the adjoining of the second film sheet may also include securing via spot welding (e.g. thermal spot welding, ultrasonic spot welding, laser spot welding, etc.) the inward-facing side of the second film sheet and the outward-facing side of the second core sheet at a third plurality of spaced locations along at least two opposing and/or adjacent, peripheral side edge portions of the second film sheet and the second core sheet to locate the second film sheet and the second cores sheet in predetermined registered relation to one another, wherein the third plurality of spaced locations also correspond with the first plurality of spaced locations noted above. In one approach, each of the securing steps referenced above may be completed by spot-welding (e.g. thermal spot welding, ultrasonic spot welding, laser spot welding, etc.) once at each of the corresponding plurality of spaced locations.

In some embodiments, the step of connecting the first core sheet and second core sheet to opposing sides of the second metallic sheet may further include providing a first inner polymer-based adhesive sheet-like layer between the first side of the second metallic sheet and the inward-facing side of the first core sheet, and a second inner polymer-based adhesive sheet-like layer coating between the second side of the second metallic sheet and the inward-facing side of the second core sheet, as part of the multi-sheet assembly. In one approach, a polymer-based adhesive (e.g. a thermoplastic and/or thermosetting coating) may be coated on and across the first side and/or second side of the second metallic sheet. In another approach, a polymer-based adhesive (e.g. a thermoplastic and/or thermosetting coating) may be coated on and across the inward-facing side of the first core sheet and/or second core sheet. In yet another approach, a thermoplastic material may be coated on and across each side of a polymer-based carrier layer (e.g. a layer comprising poly-ethylene terephthalate) to define a carrier sheet, wherein a first carrier sheet is provided between the second metallic member and the inward-facing side of the first core sheet and a second carrier sheet is provided between the second metallic sheet and the inward-facing side of the second core sheet as part of the multi-sheet assembly.

Further, the step of adjoining the first and second film sheets to the first and second core sheets, respectively, may further include providing a first outer thermosetting sheet-like layer between the outward-facing side of the first core sheet and the inward-facing side of the first film sheet, and a second outer thermosetting sheet-like layer between the outward-facing side of the second core sheet and the inward-facing side of the second film sheet, as part of the multi-sheet assembly. In one approach, the first and second outer thermosetting sheet-like layers may be coatings applied to and across the inward-facing sides of the first and second film sheets, respectively.

In turn, prior to the separation of card bodies from of the multi-sheet assembly, the connecting step may be completed by activating the first and second inner polymer-based adhesive sheet-like layers, and curing the first and second outer thermosetting sheet-like layers, together in a single operation, wherein the entire multi-sheet assembly is interconnected together. In contemplated embodiments, the activating/curing may include applying heat and pressure to an outward-facing surface of the first film sheet and to outward-facing surface of the second film sheet, wherein heat is applied to achieve a temperature across the thickness of the multi-sheet assembly (e.g. an assembly having a thickness of about 0.027 in. to 0.033 in. (0.686 mm to 0.838 mm), and wherein an integrated circuit chip is included, preferably within a range of about 0.030 in. to 0.033 in. (0.762 mm to 0.838 mm)) of at least 240° Fahrenheit and no more than, or less than, about 270° Fahrenheit. Following the activating/curing, the multi-sheet assembly may be cooled.

In one example for interconnecting the multiple material layers, the multiple material layers may be located in a heating lamination device having a set temperature of about 310° F., and applying a pressure of about 255 psi, for a first time period. In turn, the multiple material layers may be located in a cooling lamination device having a set temperature of about 58° F., and applying a pressure that initiates at about 255 psi and increases to about 410 psi over a second time period.

In one approach, after the connecting and prior to the separating, the method may further include, defining a plurality of pockets (e.g. completed or partially completed pockets) in the interconnected multi-sheet assembly in one or a plurality of rows across a length of the interconnected multi-sheet assembly in corresponding relation to said plurality of sheet regions of the multi-sheet assembly from which the plurality of card bodies are separated to provide a pocket for each of the corresponding plurality of card bodies (i.e. in corresponding relation to the plurality of transaction cards), wherein each of the plurality of pockets extend inward from a first side of the interconnected multi-sheet assembly and entirely through the first metallic sheet.

In another approach, the method may further include, after the separating, defining a pocket in each of the card bodies. For example, for each card body, a two-step milling process may include milling a first portion of the pocket that extends through the first core layer and at least a portion of the inlay, and milling a second portion of the pocket through at least a portion of the first core layer that enlarges an open end of the pocket.

After the separating step, the method may further include completing separately for each of the plurality of card bodies, in corresponding relation to the plurality of transaction cards, the following:
- the above-referenced optional step of affixing a signature panel, hologram and/or elite brand mark;
- the above-referenced locating step (e.g. locating an integrated circuit chip and contact pads in the corresponding card pocket); and,
- the above-referenced personalization steps (e.g. the defining of visible indicia step and the encoding of the integrated circuit chip and/or magnetic stripe step(s)).

Numerous additional features and advantages of the present invention will become apparent to those skilled in the art upon consideration of the embodiment descriptions provided hereinbelow.

DETAILED DESCRIPTION

Figure 1:
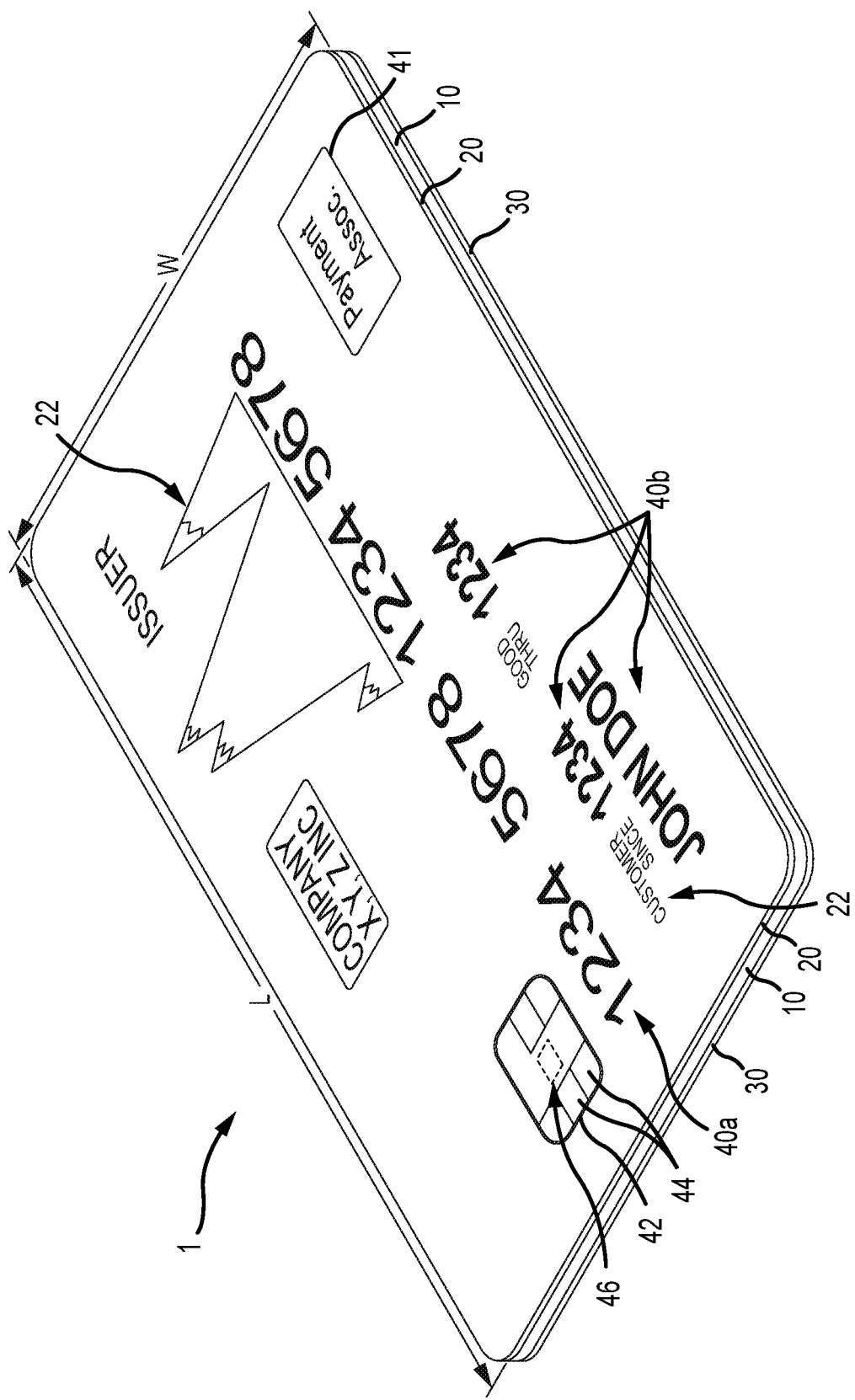
FIG. 1 is a front perspective view of one embodiment of an edge-to-edge metal transaction card.
Figure 2:
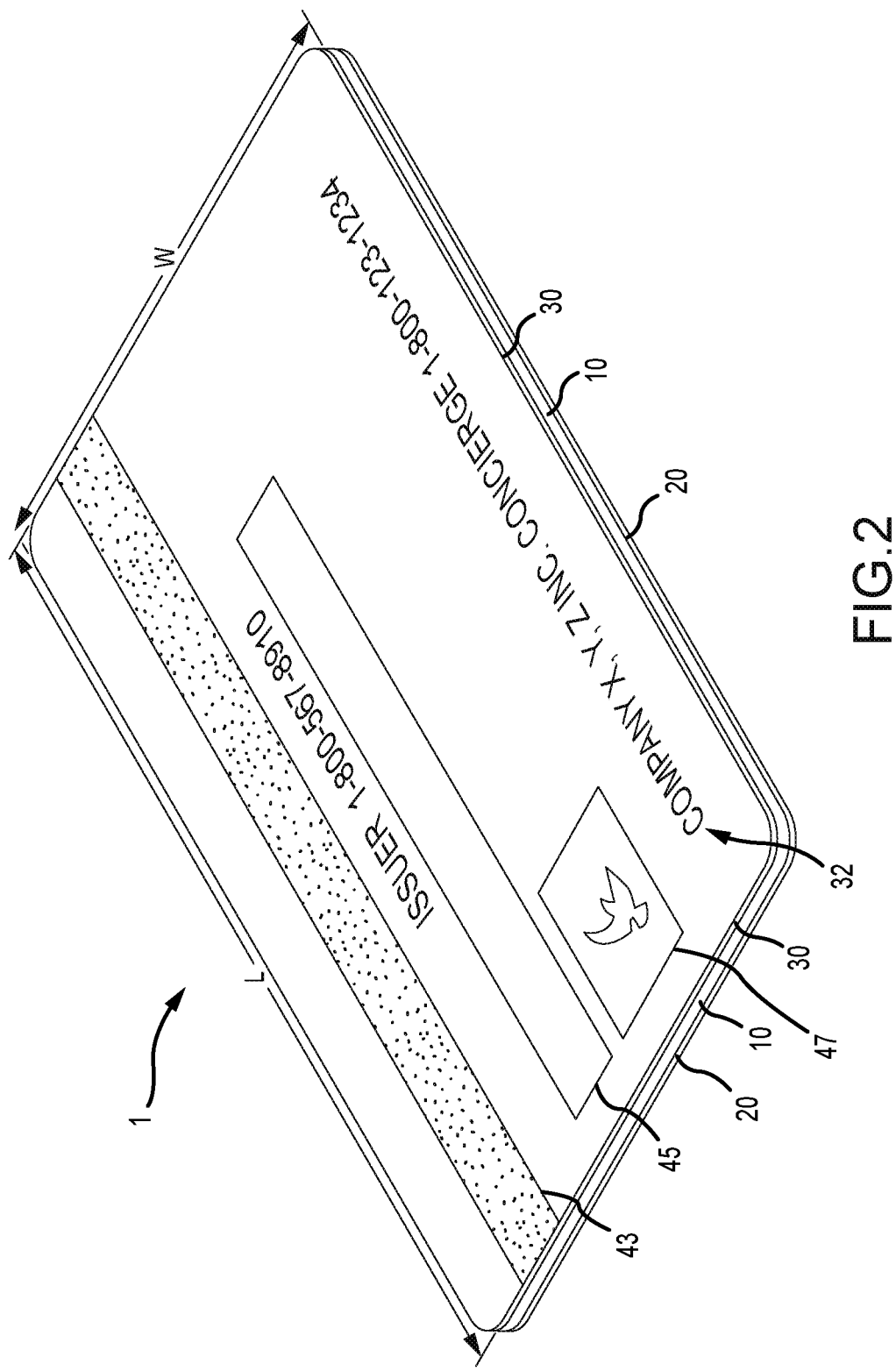
FIG. 2 is a back perspective view of the embodiment shown in FIG. 1.

FIGS. 1 and 2 illustrate one embodiment of an edge-to-edge metal transaction card 1 having a length and a width (e.g. a length, width and thickness in compliance with ISO/IEC Standards 7810). The transaction card 1 includes a metallic member 10 extending from edge-to-edge across a length L and a width W of the transaction card 1. Further, transaction card 1 includes a first core layer 20 interconnected to a first side of the metallic member 10 and extending from edge-to-edge across the length L and the width W of the transaction card 1, and a second core layer 30 interconnected to a second side of the metallic member 10 and extending from edge-to-edge across the length L and the width W of the transaction card 1. The first core layer 20 may be transparent and may be provided with printing 22 on an inward-facing side, wherein the printing 22 is visible through first side of the transaction card 1, as shown in FIG. 1. Similarly, the second core layer 30 may be transparent and may be provided with printing 32 on an inward-facing side thereof, wherein the printing 32 is visible through a second side of the transaction card 1, as shown in FIG. 2.

The printing provided on the inward-facing side of the first core layer 20 and/or on the inward-facing side of the second core layer 30 may be reverse-printed and may comprise one or more of graphics (e.g. a pictorial scene, a logo, a photo, etc.), human-readable characters (e.g. numbers, letters, and/or representations thereof), and/or one or more machine-readable markings (e.g. a bar code, a multi-dimensional matrix code, etc.). In some embodiments, printing may be provided exclusively on the inward-facing side of the first core layer 20 and/or on the inward-facing side of the second core layer 30, with no printing on the outward-facing side of the first core layer 20 and/or on the outward-facing side of the second core layer 30. Alternatively or additionally, in some embodiments, forward printing may be provided on the outward-facing side of the first core layer 20 and/or on the outward-facing side of the second core layer 30. For example, reverse printing may be provided on an inward-facing side of the first core layer 20 (e.g. with no printing provided on the outward-facing side thereof), and forward printing may be provided on an outward facing side of the second core layer 30 (e.g. with or without reverse printing on the inward-facing side thereof).

In other embodiments, a metal face may be optionally provided on an outward-facing side of the first core layer 20, with optional forward printing provided on the metal face, and/or a metal face may be optionally provided on an outward-facing side of the second core layer 30, with optional forward printing provide on the metal face. The metal face(s) may be provided by a metallized film laminated on the given core layer to provide a continuous metal face appearance. By way of example, metallization (e.g. aluminum-based metallization) may be provided on a polymer-based support film (e.g. a support film comprising polyethylene terephthalate, polypropylene, or nylon). In one approach, a continuous metallized surface may be provided on the support film to provide a continuous metal face appearance. In another approach, at least two discontinuous, differently-patterned and non-contacting metallized surfaces may be provided on the support film to combinatively provide a continuous metal face appearance, while also reducing any potential for adverse capacitive and/or electrostatic considerations attendant to the presence of the metallic member 10. For example, a first discontinuous metallized surface may be provided in a first pattern of non-contacting areas across the support film, and a second discontinuous metallized surface may be provided in a different, second pattern of non-contacting areas across a transparent, insulating layer (e.g. a polymer-based layer) overlying the first discontinuous metallized surface. By way of example, the first pattern and second pattern may be provided so that spaces between the non-contacting areas of each pattern are overlapped by the non-contacting areas of the other pattern, wherein the first and second discontinuous metallized surfaces combinatively provide a continuous metal face appearance. In one implementation, a first pattern may comprise non-contacting hexagonal areas of metallization with a continuous web-like space extending thereabout/therebetween, and a second pattern may comprise non-contacting, web-like areas of metallization overlapping the web-like space of the first pattern.

The printing 22 and/or printing 32 may comprise ink printing. By way of example, printing 22 on the inward-facing side of the first core layer 20 and/or printing 32 on the inward-facing side of the second core layer 30 may be provided by screen printing, Gravure printing, lithography, inkjet printing, or other high volume ink printing techniques. Alternatively, such printing may also be provided on outward-facing sides of the first core layer 20 and/or second core layer 30.

As further shown in FIG. 1, visible indicia 40a, 40b may be provided on the transaction card 1, wherein the visible indicia 40a comprises data corresponding with and indicative of an account uniquely associated with the transaction card 1, e.g. a payment account administered by or on behalf of card issuer payment institution. For example, the visible indicia 40a may comprise, human-readable characters indicative of a corresponding account (e.g. an account number). Further, visible indicia 40b may include additional human-readable data corresponding with the given account, including a corresponding card expiration date, a corresponding account service grade level, and/or corresponding customer-specific data (e.g. customer name, customer duration data, etc.). In FIG. 1, visible indicia 40a, 40b are provided for viewing from the first side of the transaction card 1. In other embodiments, visible indicia 40a and/or 40b may be also or alternatively provided for viewing from the second side of the transaction card 1. Visible indicia 40a, 40b may be provided on transaction card 1 as a part of card personalization.

As shown in FIG. 1, transaction card 1 may also include a pocket 42 defined in the first side of the transaction card 1, with a plurality of contact pads 44 and underlying integrated circuit (IC) chip 46 (e.g. a smart card chip shown in phantom lines) disposed within the pocket 42, wherein with the contact pads 44 are located and exposed for contact with a chip card reader device for signal transmissions therebetween to complete a financial transaction (e.g. at an ATM location, a point-of-sale location, etc.). As may be appreciated, the contact pads 44 may be provided for electrical contact interface with a contact chip reader in compliance with ISO/IEC Standard 7816. The IC chip 46 may be encoded during card personalization with data corresponding with the account indicated by visible indicia 40a. Optionally, an elite brand mark 41 (e.g. indicative of a specific payment network or card association) may be affixed to the first side of the transaction card 1.

As shown in FIG. 2, transaction card 1 may also include a magnetic stripe 43 affixed to the second side of transaction card 1. The magnetic stripe 43 may be encoded during card personalization with data corresponding with the account indicated by visible indicia 40a. The magnetic stripe 43 may be provided in compliance with ISO/IEC Standard 7810 and/or 7811. As further shown in FIG. 2, a signature block 45 and/or hologram 47 may also be affixed to the second side of the transaction card 1 (e.g. via hot-stamping).

Figure 3:
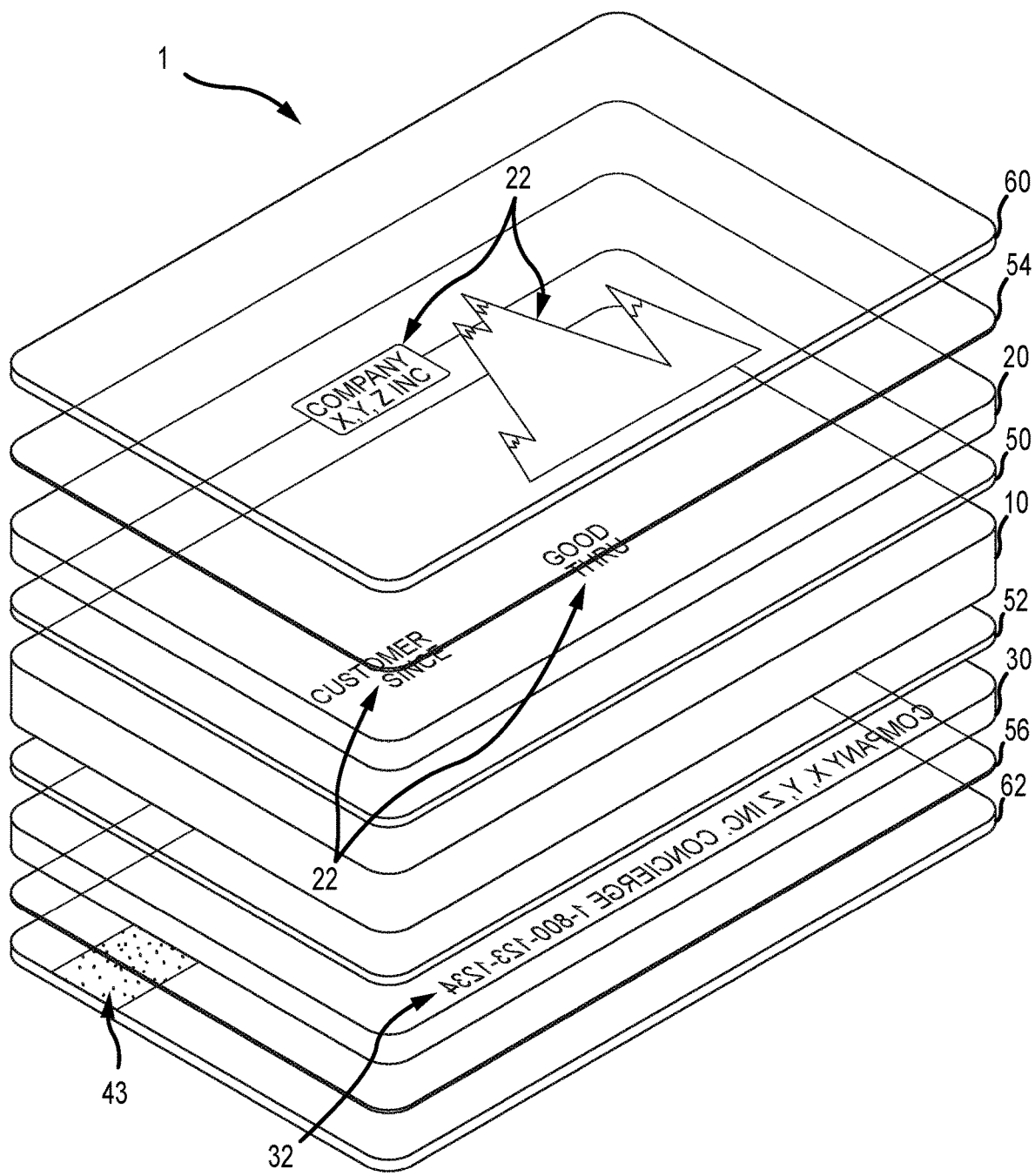
FIG. 3 is an exploded perspective view of various layers that may be provided in an embodiment of an edge-to-edge metal transaction card.

Reference is now made to FIG. 3, which illustrates various additional layers that may be provided in a card body comprising the transaction card 1, wherein the thicknesses of such layers are exaggerated in relation to the length L and width W dimensions of the transaction card 1. As shown, in addition to the metallic member 10, first core layer 20 and second core layer 30, the transaction card 1 may include a first inner polymer-based adhesive layer 50 disposed between and interconnecting the metallic member 10 and the inward-facing side of the first core layer 20. Similarly, a second inner polymer-based adhesive layer 52 may be disposed between and interconnecting the metallic member 10 and the inward-facing side of the second core layer 30. In one approach, the first inner polymer-based adhesive layer 50 may be provided as a thermosetting coating (e.g. a thermosetting resin) applied to the first side of the metallic member 10, and the second inner polymer-based adhesive layer 52 may be provided as a thermosetting coating (e.g. a thermosetting resin) applied to the second side of the metallic member 10. In another approach, the first inner polymer-based adhesive layer 50 and/or the second inner polymer-based adhesive layer 52 may be provided as a thermoplastic coating (e.g. a thermosetting plastic resin) disposed on an outward-facing corresponding side of a carrier member that also has a thermoplastic coating (e.g. a thermosetting plastic resin) disposed on an inward-facing side thereof for interconnection to the metallic member 10. In any case, the first inner polymer-based adhesive layer 50 and/or the second inner polymer-based adhesive layer 52 may be transparent so as to facilitate viewing of printing provided on the first core layer through the first side of the transaction card 1 and/or printing provided on the second core layer 30 through the second side of the transaction card 1.

As further shown in FIG. 3, transaction card 1 may include a first film layer 60 interconnected to an outward-facing side of the first core layer 20 and extending from edge-to-edge across the length L and the width W of the transaction card 1, and a second film layer 62 interconnected to an outward facing side of the second core layer 30 and extending from edge-to-edge across the length L and the width W of the transaction card 1. The first film layer 60 and/or the second film layer 62 may be transparent to facilitate the viewing of printing 22 and/or printing 32 that may be provided on the first core layer 20 and/or second core layer 30, respectively, as discussed above. The second film layer 62 may be provided with a magnetic stripe on an outward-facing side thereof.

Additionally, and as further shown in FIG. 3, transaction card 1 may include a first outer thermoset layer 54 disposed between and interconnecting the first core layer 20 and an inward-facing side of the first film layer 60. Similarly, a second outer thermoset layer 56 may be disposed between and interconnecting the second core layer 30 and the inward-facing side of the second film layer 62. In one approach, the first outer thermoset layer 54 may be provided as a thermosetting coating (e.g. a thermosetting adhesive) applied to an inward-facing side of the first film layer 60, and the second outer thermoset layer 56 may be provided as a thermosetting coating (e.g. a thermosetting adhesive) applied to an inward-facing side of the second film layer 62. In another approach, the first outer thermoset layer 54 may be provided as a thermosetting coating (e.g. a thermosetting adhesive) applied to an outward-facing side of the first core layer 20, and the second outer thermoset layer 56 may be provided as a thermosetting coating (e.g. a thermosetting adhesive) applied to an outward-facing side of the second core layer 30.

The metallic member 10 and additional layers described in relation to FIG. 1, FIG. 2 and/or FIG. 3 may be assembled in stacked relation to establish interconnections therebetween to provide the transaction card 1. For example, after stacked assembly of the layers, and prior to the provision of the visible indicia 40a, 40b, pocket 42, contact pads 44, IC chip 46, elite brand mark 41, signature block 45 and hologram 47, the assembled layers may be heated under pressure to a predetermined temperature range across the assembled layers, wherein the polymer-based adhesive layers 50, 52, and thermoset layers 54 and 56 are activated, or cured, so as to fixedly interconnect the corresponding adjacent layers between which such thermoset layers 50, 52, 54 and 56 are disposed. The predetermined temperature range across the assembled layers may be established to comprise temperatures lower than heat distortion temperatures, or softening temperatures, of the first core layer 20, second core layer 30, first film layer 60, and second film layer 62. More particularly, the predetermined temperature range across the assembled layers may be from at least about 240° Fahrenheit to no more than or less than, about 270° Fahrenheit.

In one example, a transaction card 1 may be provided with layers having the following thicknesses:
first film layer 60 with first outer thermoset layer 54 applied thereto: about 2 mils (0.051 mm);
first core layer 20 (e.g. with or without an optional metal face): about 5 mils-8 mils (0.127 mm-0.203 mm);
first inner polymer-based adhesive layer 50: about 1 mil-3 mils (0.025 mm-0.076 mm);
metallic member 10: about 11 mils-12 mils (0.279 mm-0.305 mm);
second inner polymer-based adhesive layer 52; about 1 mil-3 mils (0.025 mm-0.076 mm);
second core layer 30 (e.g. with or without an optional metal face): about 5 mils-8 mils (0.127 mm-0.203 mm);
second film layer 62 with second outer thermoset layer 56 applied thereto: about 2 mils (0.051 mm).
In conjunction with such example, the transaction card 1 may have a post-lamination thickness of about 30 mils-33 mils (0.762 mm-0.838 mm). Further, the metallic member may comprise stainless steel. In such example, the total weight of the transaction card 1 may about 12 g., with the metallic member weighing about 8.75 g., and the remaining layers having a total weight of about 3.25 g.

In some embodiments, subsequent to assembly and interconnection of the layers of the transaction card 1, the visible indicia 40, pocket 42, contact pads 44, IC chip 46, elite brand mark 41, signature block 45 and hologram 47, may be provided as shown in FIGS. 1 and 2.

For example, the pocket 42 may be provided to extend through a portion of the thickness of the transaction card 1 from the first side thereof, wherein at least a portion of the pocket 42 extends entirely through the first film layer 60, first outer thermoset layer 54, first core layer 20, first inner thermoset layer 52 and metallic member 10 described above in relation to FIG. 3. In one approach, a first portion P1 of the pocket 42 may be defined by a first operation (e.g. milling and/or die pressing) so that the first portion extends through the noted layers, and a second portion P2 of the pocket 42 may be defined by a second operation (e.g. milling) so that the second portion enlarges a cross-dimension of the open end of pocket 42, through at least a portion of the first core layer 20, but does not extend in to the metallic member 10 of the transaction card 1. For example, the second portion may be of a ring-shaped configuration that adjoins and extends about the first portion at the first side of the transaction card 1, thereby defining a shelf within pocket 42.

Following the formation of the pocket 42, contact pad 44 and IC chip 46 may be located in the pocket 42. In one approach, the contact pads 42 may be supportably interconnected to a top side of a substrate carrier, and the IC chip 46 may be supportably interconnected to an opposing bottom side of the substrate carrier with one or more electrical connections provided between the IC chip 46 and contact pads 44 to define an IC chip module that is secured within the pocket 42 (e.g. via an adhesive provided on at least the above-referenced shelf within the pocket 42), with at least a portion of the IC chip 46 projecting in to the first portion of pocket 42 that extends through the metallic layer 10. In the later regard, the IC chip may be disposed free from electrical interconnection with the metallic member 10.

Additionally, subsequent to assembly and interconnection of the layers of the transaction card 1, optional elite brand mark 41, signature panel 45 and hologram 47 may be affixed (e.g. hot-stamped). Further, the visible indicia 40a, 40b may be defined, and the IC chip 46 and magnetic stripe 43 may be encoded with personalization data, during card personalization procedures.

In contemplated arrangements, all or at least a portion of the visible indicia 40 may be defined at an outward-facing surface of the first film layer 60 (e.g. by at least one of laser engraving, ink jet printing and thermal printing). By way of particular example, visible indicia 40 may be defined at the outward-facing surface of the first film layer 60 by laser engraving, wherein the first film layer 60 may comprise a polymer-based material having a laser reactive material dispersed therein (e.g. particles that change from being transparent to an opaque color upon laser reaction, including carbon particles). When the visible indicia 40 is defined by any of laser engraving, ink jet printing and thermo-printing, a carbon containing ink may be utilized for printing on the first core layer 20 and/or second core layer 30. Alternatively, in laser engraving embodiments, carbonless ink may be utilized for printing on the first core layer 20 and/or second core layer 30.

In some embodiments, transaction card 1 may be produced as one of a corresponding plurality of transaction cards to realize production efficiencies. In that regard, reference is now made to FIGS. 4-7 which illustrate a multi-sheet assembly 100 of multiple sheet layers having a plurality of sheet regions 101 from which a plurality of card bodies may be separated and further processed to yield a corresponding plurality of transaction cards, each as described above in relation to transaction card 1. While FIGS. 4-7 illustrate the assembly of a multi-sheet assembly 100 having four sheet regions 101 from which four card bodies may be separated (i.e. arranged in two rows and two columns), a larger multi-sheet assembly may be utilized to yield a greater number of card bodies (e.g. 28 card bodies arranged in 4 rows and 7 columns).

Figure 4:
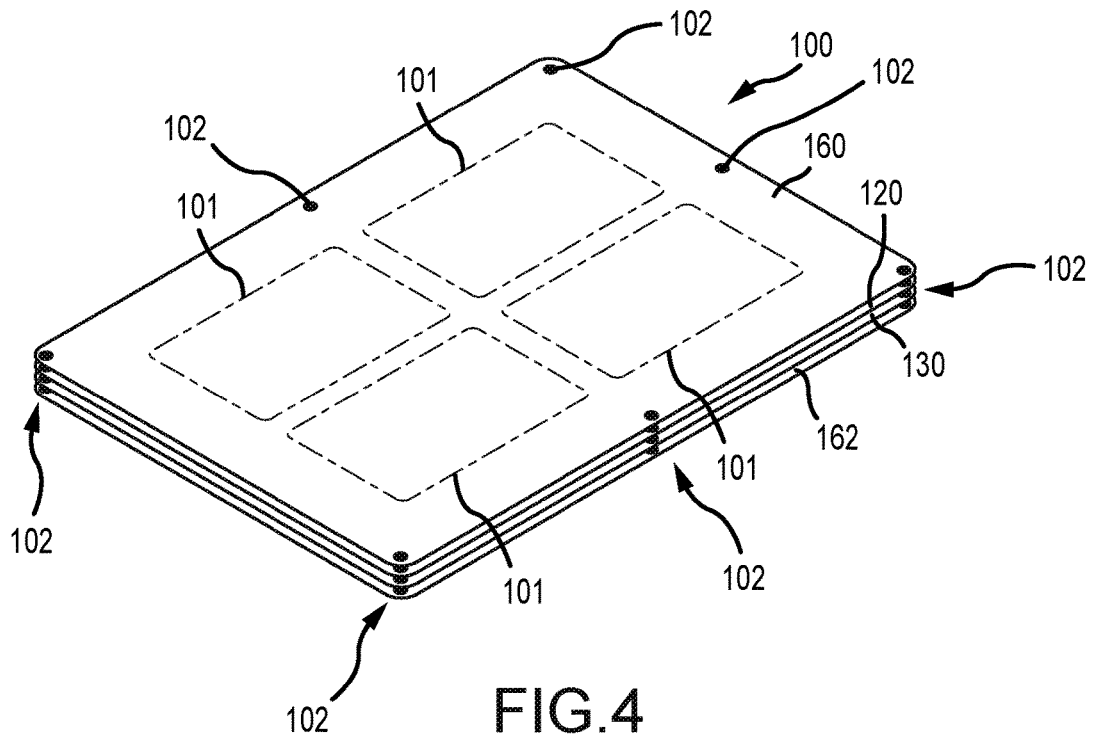
FIG. 4 is a perspective view of one embodiment of a multi-layer assembly for production of a plurality of edge-to-edge metal transaction cards.

With specific reference to FIG. 4, a first core sheet 120 (e.g. corresponding with first core layer 20) and second core sheet 130 (e.g. corresponding with second core layer 30) may be arranged so that inward-facing sides thereof are located in face-to-face relation. Additionally, a first film sheet 160 (e.g. corresponding with first film layer 60) and a second film sheet 162 (e.g. corresponding with second film layer 62) may be arranged so that inward-facing sides thereof are located in face-to-face relation to outward-facing sides of the first core sheet 120 and second core sheet 130, respectively.

Prior to arranging the multi-sheet assembly 100 as shown in FIG. 4, printing may be provided at each of a plurality of different locations (i.e. in corresponding relation to each of the plurality of sheet regions 101 from which a corresponding plurality of card bodies will be separated) on the inward-facing side of the first core sheet 120 to provide printing 22 as described above in relation to FIGS. 1 and 3. In that regard such printing 22 may be the same for each of the card bodies 101 to be separated. Similarly, printing may be provided at each of a plurality of different locations (i.e. in corresponding relation to each of the plurality of sheet regions 101 from which a corresponding plurality of card bodies will be separated) on the inward-facing side and/or outward-facing side of the second core sheet 130 to provide printing 32 as described above in relation to FIGS. 2 and 3. In that regard, such printing 32 may be the same for each of the card bodies to be separated.

In other embodiments, prior to arranging the multi-sheet assembly 100 as shown in FIG. 4, the first core sheet 120 and/or the second core sheet 130 may be provided with a corresponding metal face on an outward-facing side thereof. In that regard, each metal face may be provided by laminating (e.g. adhering) a metallized film sheet to the given core layer. In turn, printing analogous to printing 22 and/or 32 may be provided on a metal face of first core sheet 120 and/or second core sheet 130 (e.g. conventional and/or 3D printing with optional transparent, protective printing provided thereupon), respectively, at each of a plurality of different locations (i.e. in corresponding relation to each of the plurality of sheet regions 101 from which a corresponding plurality of card bodies will be separated). In some embodiments, the providing of and printing upon a given metal face may be completed in a single, continuous automated operation.

With further reference to FIG. 4, the multi-sheet assembly 100 may be initially secured together at a plurality of spaced locations 102 during production so as to maintain the various sheets in predetermined registered relation to one another. For example, the inward-facing side of the first core sheet 120 and the inward-facing side of the second core sheet 130 may be secured together at a plurality of spaced locations 102 along at least two opposing and/or adjacent, peripheral side portions thereof (e.g. along three opposing, peripheral side edge portions) to define an accessible space therebetween, and the inward-facing sides of the first film sheet 160 and the second film sheet 162 may be secured to outward-facing sides of the first core sheet 120 and second core sheet 130, respectively, at a corresponding plurality of spaced locations 102 along at least two opposing and/or adjacent, peripheral side edge portions thereof (e.g. along three opposing, peripheral side edge portions). As illustrated, each of the securement locations 102 are located outside of the plurality of sheet regions 101 from which the card bodies will be separated. In one approach, each of the corresponding securement locations 102 may be achieved via spot-welding after arranging the various sheets as shown in FIG. 4 (e.g. via thermal spot welding, ultrasonic spot welding, laser spot welding, etc.).

Figure 5:
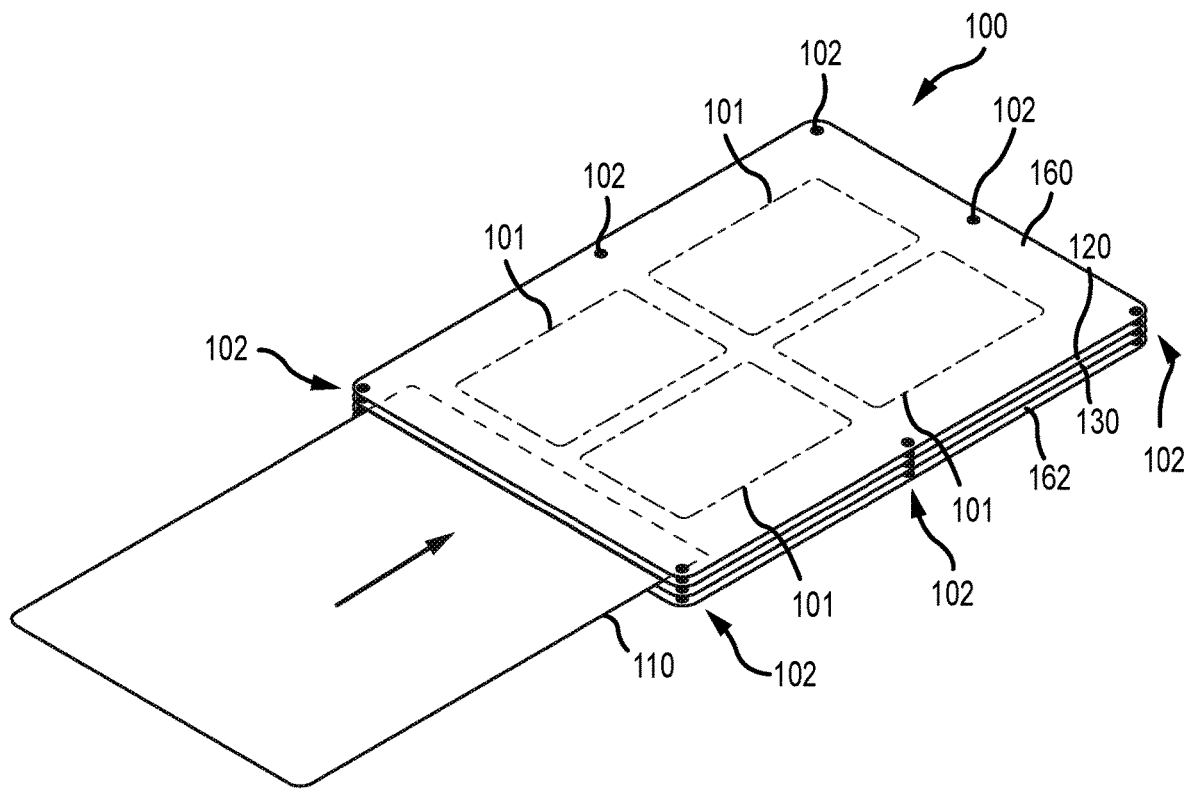
FIG. 5 is a perspective view of the multi-layer assembly embodiment of FIG. 4 with a metallic sheet being positioned therewithin.
Figure 6:
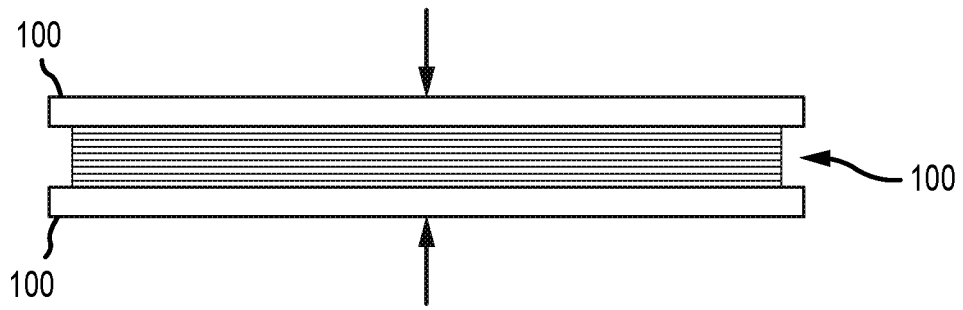
FIG. 6 is a side schematic view of the multi-layer assembly of FIGS. 4 and 5 during interconnection of the various layers thereof during production of a plurality of edge-to-edge metal transaction cards.

Reference is now made to FIG. 5. As shown, a metallic sheet 110 may be inserted in to the accessible space defined between the first core layer 120 and the second core layer 130 from an open end thereof. Such an approach facilitates positioning of the metallic sheet 110, first core sheet 120, second core sheet 130, first film sheet 160 and second film sheet 162, while maintaining the positions of the first core sheet 120, second core sheet 130 first film sheet 160 and second film sheet 162 in predetermined registered relation to one another.

In contemplated embodiments, a first inner polymer-based adhesive sheet-like layer may be provided between the inward-facing side of the first core sheet 120 and a first side of the metallic sheet 110 facing the first core sheet 120, and a second inner polymer-based adhesive sheet-like layer may be provided between the inward-facing side of the second core sheet 130 and a second side of metallic sheet 110 facing the second core sheet 130 as part of the multi-sheet assembly 100. In one approach, a polymer-based adhesive (e.g. a thermoplastic and/or thermosetting coating) may be coated on the first side and/or second side of the metallic sheet. In another approach, a polymer-based adhesive (e.g. a thermoplastic and/or thermosetting coating) may be coated on the inward-facing side of the first core layer and/or second core layer. In yet another approach, a thermoplastic material may be coated on each side of a polymer-based carrier layer (e.g. a layer comprising polyethylene terephthalate) to define a carrier sheet, wherein a first carrier sheet is provided between the metallic member and the inward-facing side of the first core layer and a second carrier sheet is provided between the metallic sheet and the inward-facing side of the second core layer as part of the multi-sheet assembly.

Further, in contemplated embodiments a first outer thermosetting sheet-like layer may be provided between the outward-facing side of the first core sheet 120 and the inward-facing side of the first film sheet 160, and a second outer thermosetting sheet-like layer may be provided between the outward-facing side of the second core sheet 130 and the inward-facing side of the second film sheet 162 as part of the multi-sheet assembly 100. In one approach, the first and second outer sheet-like thermosetting layers may be coatings applied to the inward-facing sides of the first and second film sheets, respectively.

To interconnect the first film sheet 162, first core sheet 120, metallic sheet 110, second core sheet 130 and second film sheet 162, the multi-sheet assembly 100, the above-referenced polymer-based adhesive layers and thermosetting layers may be activated by heating then cooled to define layers corresponding with layers 50, 52, 54 and 56 referenced above. In that regard, and with reference to FIG. 6, heat and pressure may be applied to the multi-sheet assembly 100 via opposing platens 200 of a lamination device on opposing sides of the multi-sheet assembly 100. In some implementations, the applied heat may be provided so that a temperature within and across the multi-sheet assembly 100 (e.g. an assembly having a combined thickness of about 0.027 in. to 0.033 in.) reaches a temperature of at least 240° Fahrenheit and no more than, or less than, about 270° Fahrenheit. After heating, the platens 200 may be cooled to cool the multi-sheet assembly 100.

Figure 7:
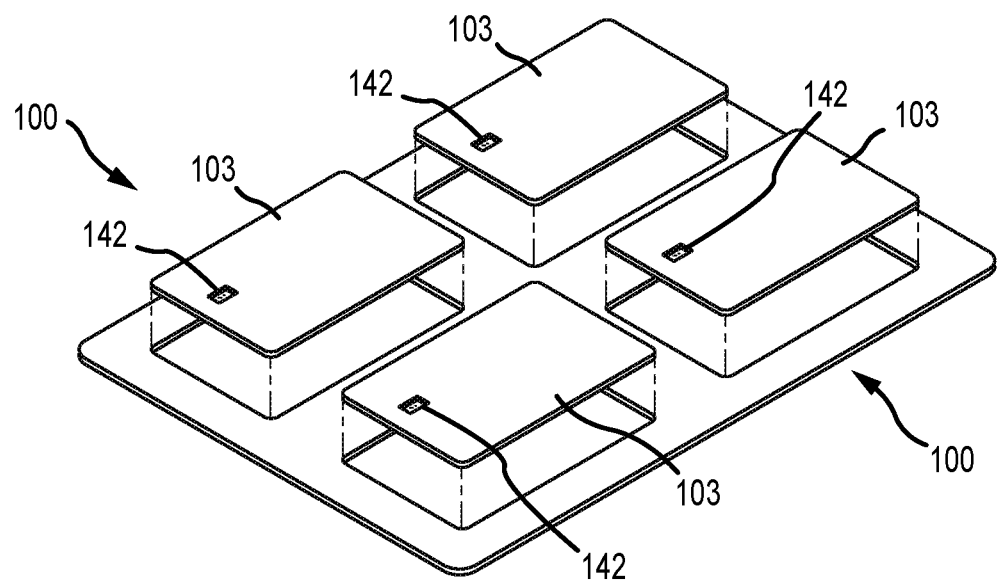
FIG. 7 is a perspective view of the multi-layer assembly embodiment of FIGS. 4-6 with a plurality of card bodies being separated therefrom during production of a plurality of edge-to-edge metal transaction cards.

Following interconnection of various sheets and thermoset layers of the multi-sheet assembly 100, a plurality of card bodies 103 may be separated from the multi-sheet assembly 100, as shown in FIG. 7. Further, prior to or in conjunction with such separation, pockets 142 may be defined in predetermined relation to each of the card bodies 103 to be separated from the multi-sheet assembly 100. In one approach, each of the pockets 142 may be milled (e.g. utilizing a computer numeric controlled milling machine), followed by separation of the card bodies 103 from the multi-sheet assembly 100 via milling (e.g. utilizing a computer numeric controlled milling machine). In conjunction with such approach, the card bodies 103 may be separated from the multi-sheet assembly 100 first and the pockets 142 milled while the card bodies 103 are still being held in place by a vacuum fixture. In another approach, pockets (e.g. pocket portions P1 and P2 referenced above) may be milled separately in line on a smartcard standalone milling machine or on an inline milling station on a smart card machine.

In other embodiments, the card bodies 103 may be separated from the multi-sheet assembly 100 via a punch and optional polish operation. In turn, the pockets 142 may be milled before or after punching (e.g. while the card bodies 103 are still being held in place by a vacuum fixture). In another approach, pockets (e.g. pocket portions P1 and P2 referenced above) may be milled separately after punching in line on a smartcard standalone milling machine or on an inline milling station on a smart card machine.

Following the separation of card bodies 103, the card bodies 103 may be cleaned as necessary, and peripheral edges of the card bodies 103 may be polished if desired. In turn, the card bodies 103 may be further processed to yield a plurality of transaction cards, each having features as described above in relation to transaction card 1.

Figure 8:
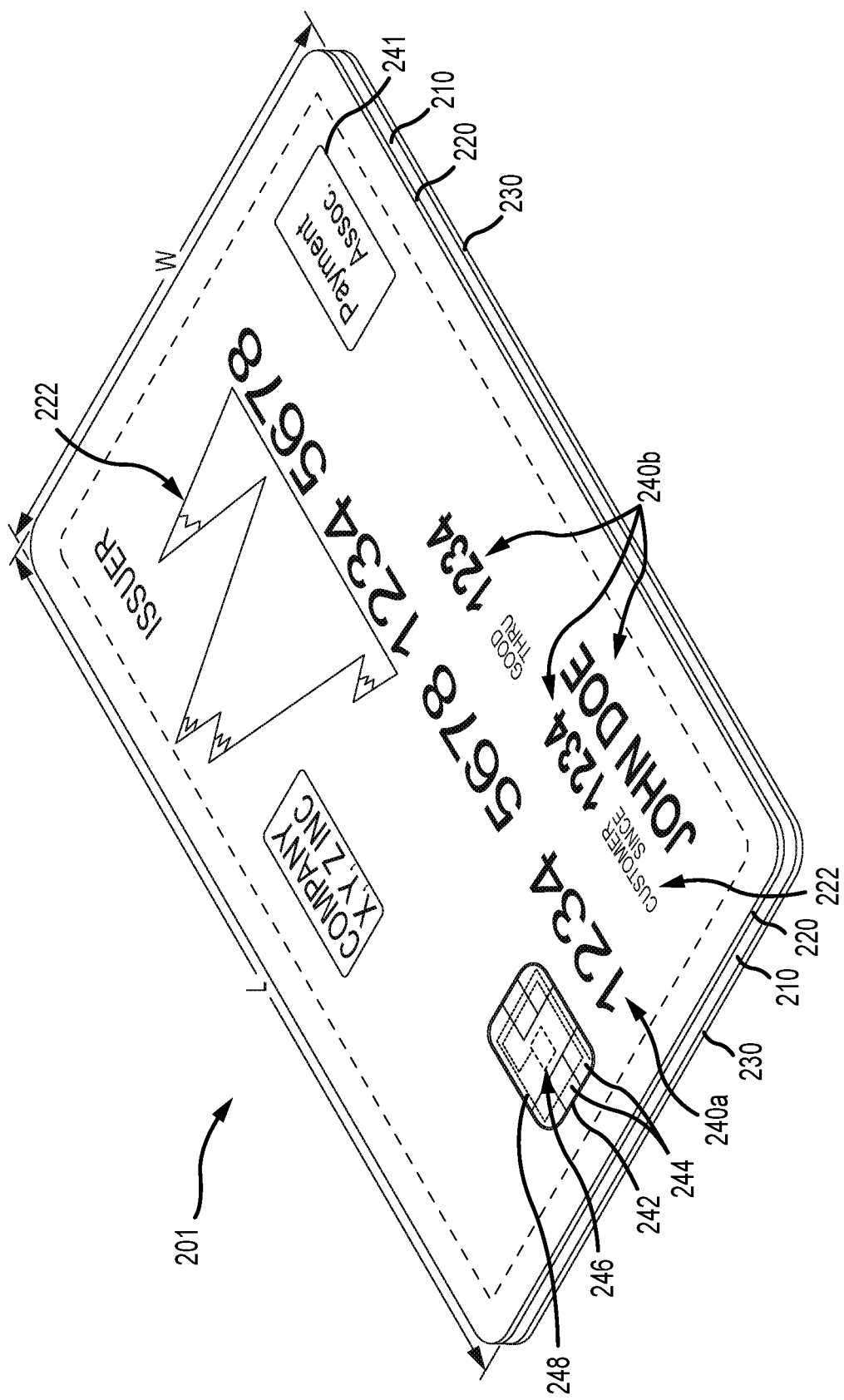
FIG. 8 is a front perspective view of another embodiment of an edge-to-edge metal transaction card.
Figure 9:
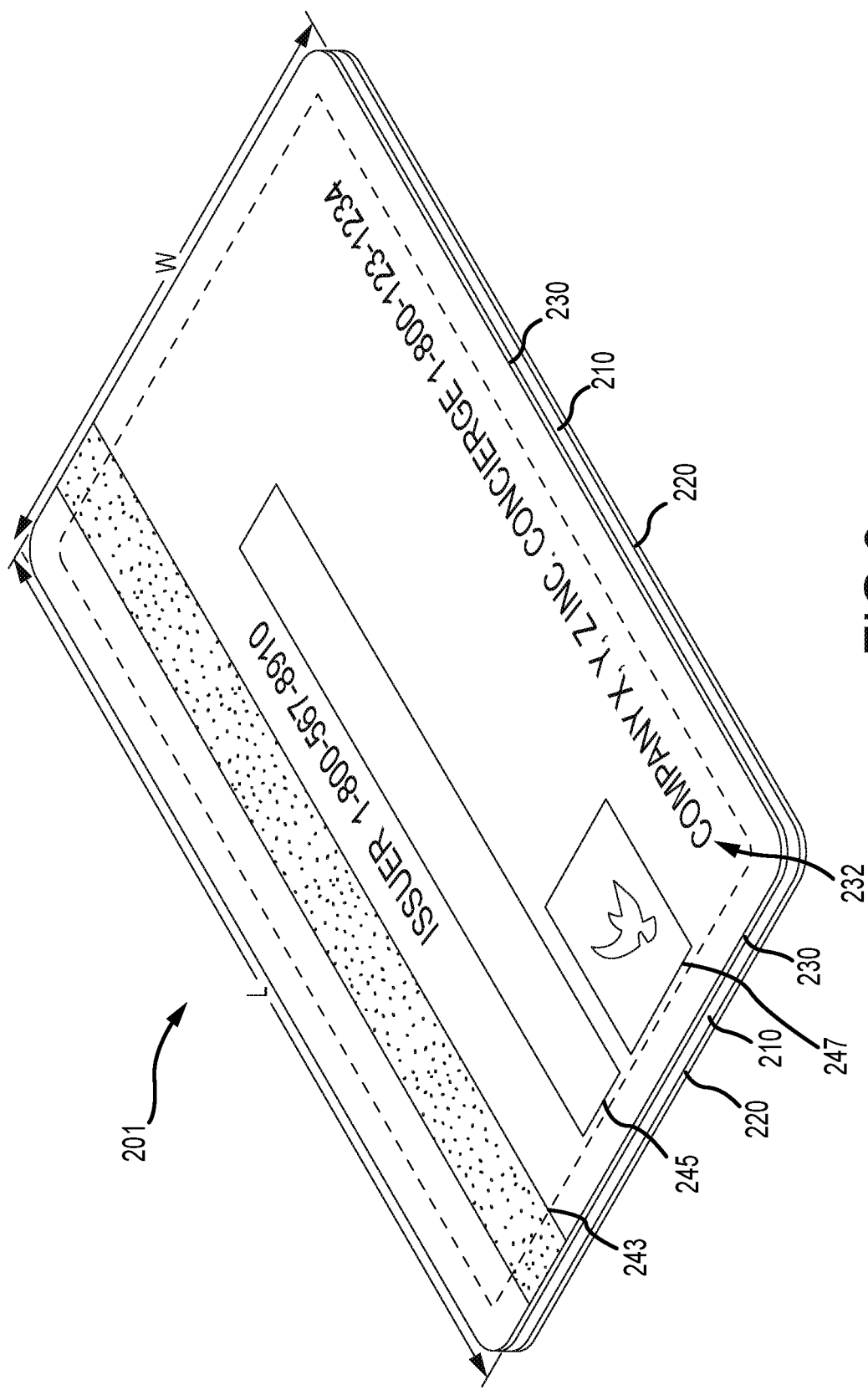
FIG. 9 is a back perspective view of the embodiment shown in FIG. 8.

Reference is now made to FIGS. 8 and 9 which illustrate another embodiment of an edge-to-edge metal transaction card 201 having a length and a width (e.g. a length, width and thickness in compliance with ISO/IEC Standard 7810). The transaction card 201 includes a metallic member 210 having a frame-like configuration with an opening therethrough, as indicated by phantom lines in FIGS. 8 and 9, and further discussed below. The metallic member 210 may extend from edge-to-edge about a length L and width W of the transaction card 201. Further, transaction card 201 may include a first core layer 220 interconnected to a first side of the metallic member 210 and extending from edge-to-edge across the length L and the width W of the transaction card 201, and a second core layer 230 interconnected to a second side of the metallic member 210 and extending from edge-to-edge across the length L and the width W of the transaction card 201. The first core layer 220 may be opaque and may be provided with printing 222 on an outward-facing side, wherein the printing 222 is visible through a first side of the transaction card 201, as shown in FIG. 8. Similarly, the second core layer 30 may be opaque and may be provided with printing 232 on an outward-facing side thereof, wherein the printing 232 is visible through a second side of the transaction card, as shown in FIG. 9.

Optionally, a metal face may be optionally provided on an outward-facing side of the first core layer 220, with optional forward printing 222 provided on the metal face, and/or a metal face may be optionally provided on an outward-facing side of the second core layer 230, with optional forward printing 232 provide on the metal face. The metal face(s) may be provided by a metallized film laminated on the given core layer to provide a continuous metal face appearance. By way of example, metallization (e.g. aluminum-based metallization) may be provided on a polymer-based support film (e.g. a support film comprising polyethylene terephthalate, polypropylene, or nylon). In one approach, a continuous metallized surface may be provided on the support film to provide a continuous metal face appearance. In another approach, at least two discontinuous, differently-patterned and non-contacting metallized surfaces may be provided on the support film to combinatively provide a continuous metal face appearance, while also reducing any potential for adverse capacitive and/or electrostatic considerations attendant to the presence of the metallic member 210. For example, a first discontinuous metallized surface may be provided in a first pattern of non-contacting areas across the support film, and a second discontinuous metallized surface may be provided in a different, second pattern of non-contacting areas across a transparent, insulating layer (e.g. a polymer-based layer) overlying the first discontinuous metallized surface. By way of example, the first pattern and second pattern may be provided so that spaces between the non-contacting areas of each pattern are overlapped by the non-contacting areas of the other pattern, wherein the first and second discontinuous metallized surfaces combinatively provide a continuous metal face appearance. In one implementation, a first pattern may comprise non-contacting hexagonal areas of metallization with a continuous web-like space extending thereabout/therebetween, and a second pattern may comprise non-contacting, web-like areas of metallization overlapping the web-like space of the first pattern. The printing provided on the outward-facing side of the first core layer 220 and/or on the outward-facing side of the second core layer 230 may be forward-printed and may comprise one or more of graphics (e.g. a pictorial scene, a logo, a photo, etc.), human-readable characters (e.g. numbers, letters, and/or representations thereof), and/or one or more machine-readable markings (e.g. a bar code, a multi-dimensional matrix code, etc.). In some embodiments, printing may be provided exclusively on the outward-facing side of the first core layer 220 and/or on the outward-facing side of the second core layer 230, with no printing on the inward-facing side of the first core layer 220 and/or on the inward-facing side of the second core layer 230. Alternatively or additionally, in some embodiments, reverse printing may be provided on the inward-facing side of a transparent first core layer 220 and/or on the inward-facing side of a transparent second core layer 230.

The printing 222 and/or printing 232 may comprise ink printing. By way of example, printing 222 on the outward-facing side of the first core layer 220 and/or printing 232 on the outward-facing side of the second core layer 230 may be provided by screen printing, Gravure printing, lithography, inkjet printing, or other high volume ink printing techniques.

As further shown in FIG. 8, visible indicia 240a, 240b may be provided on the transaction card 201, wherein the visible indicia 240a comprises data corresponding with and indicative of an account uniquely associated with the transaction card 201, e.g. a payment account administered by or on behalf of card issuer payment institution. For example, the visible indicia 240a may comprise, human-readable characters indicative of a corresponding account (e.g. an account number). Further, visible indicia 240b may include additional human-readable data corresponding with the given account, including a corresponding card expiration date, a corresponding account service grade level, and/or corresponding customer-specific data (e.g. customer name, customer duration data, etc.). In FIG. 8, visible indicia 240a, 240b are provided for viewing from the first side of the transaction card 201. In other embodiments, visible indicia 240a and/or 240b may be also or alternatively provided for viewing from the second side of the transaction card 201.

Visible indicia 240a, 240b may be provided on transaction card 201 as a part of card personalization.

As shown in FIG. 8, transaction card 201 may also include a pocket 242 defined in the first side of the transaction card 201, with a plurality of contact pads 244 and an underlying integrated circuit (IC) chip 246 (e.g. a smart card chip shown by phantom lines) and interconnected antenna 248 (e.g. one or more metallic loops shown by phantom lines) disposed within the pocket 242, wherein with the contact pads 244 are located and exposed for contact with a chip card reader device for signal transmissions therebetween to complete a financial transaction (e.g. at an ATM location, a point-of-sale location, etc.). As may be appreciated, the contact pads 244 may be provided for electrical contact interface with a contact chip reader in compliance with ISO/IEC Standard 7816. The IC chip 246 may be encoded during card personalization with data corresponding with the account indicated by visible indicia 240a. Optionally, an elite brand mark 241 (e.g. indicative of a specific payment network or card association) may be affixed to the first side of the transaction card 201.

With further reference to FIG. 9, transaction card 201 may also include a magnetic stripe 243 affixed to the second side of transaction card 201. The magnetic stripe 243 may be encoded during card personalization with data corresponding with the account indicated by visible indicia 240a. The magnetic stripe 243 may be provided in compliance with ISO/IEC Standard 7811. As further shown in FIG. 9, a signature block 245 and/or hologram 247 may also be affixed to the second side of the transaction card 201 (e.g. via hot-stamping).

Figure 10A:
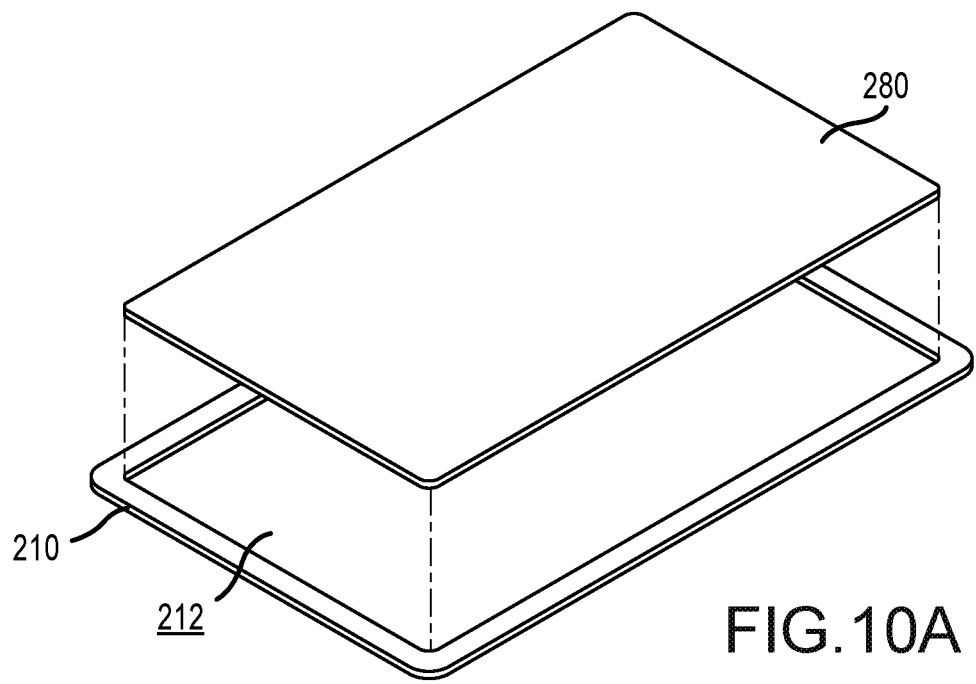
FIGS. 10A and 10B are exploded and assembly views, respectively, of an inlay and metallic member of the embodiment of FIG. 8.
Figure 10B:
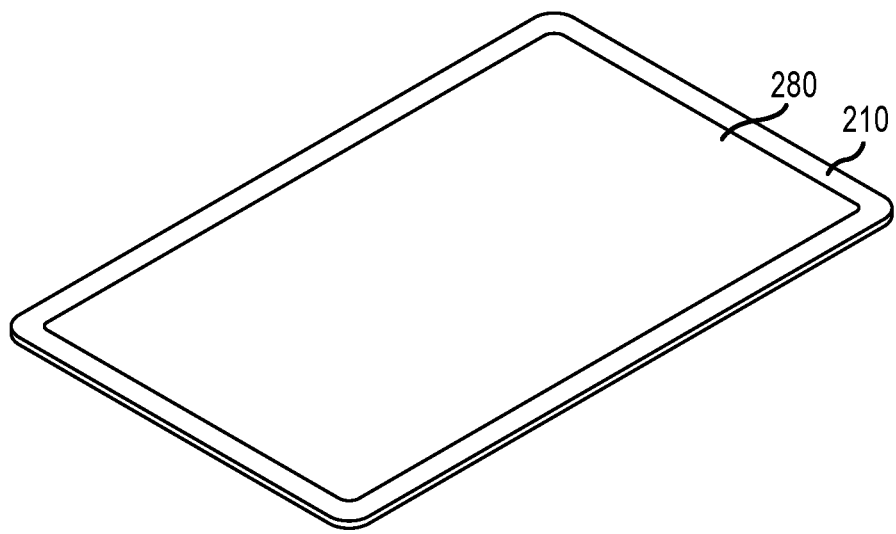

As indicated above and shown in FIGS. 10A and 10B, the metallic member 210 may be of a frame-like configuration with an opening 212 extending therethrough. In turn, a non-metallic inlay 280 (e.g. a polymer-based inlay) may be disposed within the opening 212 to combinatively define a layer of transaction card 201. In that regard, an outer periphery of the inlay 280 and an outer periphery of the opening 212 may have the same or substantially the same configurations to facilitate conformal positioning of the inlay 280 within the opening 212 of the metallic member 210. For example, in one approach, the inlay 280 may be press fit in to the opening 212, and optionally, a thermosetting region may be provided in any open space therebetween. In the illustrated embodiment, the opening 212 and inlay 280 have corresponding rectangular configurations and may have the same or substantially the same thickness.

In some implementations the opening 212 may define a first area (e.g., an area defined by and laterally across the opening) within a range of about 20% to about 70% and a second area defined by the length L and width W of the transaction card 201. In some arrangements, the first area may be at least about 40% of the second area, and preferably within a range of about 40% to about 70% of the second area. In that regard, the first area may be substantially rectangular to receive a substantially rectangular inlay. In another description, the metallic member 210 may define a third area (i.e. an area defined by and laterally across the metallic member 210, i.e. excluding the opening), and inlay 280 may define a fourth area (i.e. an area defined by and laterally across the inlay 280), wherein the fourth area is at least about 1.5 times greater than the fourth area.

The inlay 280 may be provided with an inlay antenna supportably interconnected thereto for non-contact coupling (e.g. inductive coupling) with the antenna 248 referenced above in relation to FIG. 8. More particularly, the inlay antenna may be provided for coupling with an antenna 248 for contactless RF signal transmissions to/from a contactless card reader (e.g. in compliance with ISO/IEC Standard 14443).

Figure 11:
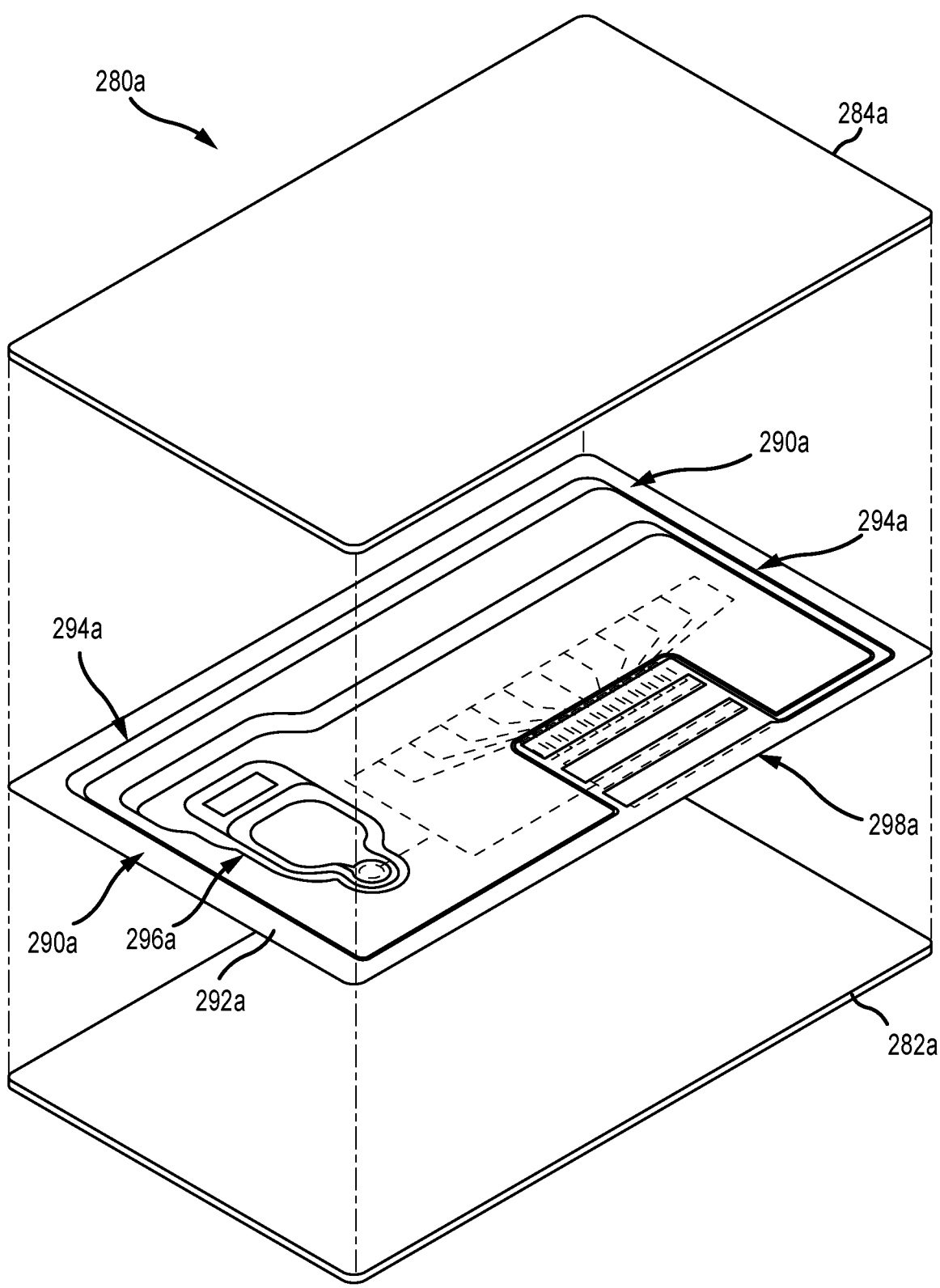
FIG. 11 is an exploded view of one embodiment of an inlay of the embodiment of FIG. 8.

In that regard, reference is made to FIG. 11 which illustrates one embodiment of an inlay 280a having an inlay antenna 290a disposed on an non-conductive substrate 292a (e.g. disposed via plating and etching operations), wherein the substrate 292 and inlay antenna 290a are disposed between a first inlay layer 282a and second inlay layer 284a (e.g. a polymer-based inlay layers). As shown in FIG. 11, inlay antenna 290a may comprise at least one outer metallic loop 294a and at least one interconnected inner metallic loop 296a for signal transmissions. More particularly, upon assembly of the transaction card 201, the inlay 280a may be provided so that the inner metallic loop(s) 296a is located in overlapping relation to antenna 248 referenced above in relation to FIG. 8, thereby facilitating inductive coupling therebetween for signal transmissions to/from contactless card reader.

In contemplated implementations, the inlay 280a and metallic member 210 may be provided so that, upon locating the inlay 280a in the opening 212 of the metallic member 210, the outer metallic loop(s) 294(a) is spaced from the metallic member 210 by a distance of at least 3 mm (i.e. 0.118 in.). As further illustrated in FIG. 11, the antenna 290a may include circuit portions defined on opposing sides of substrate 292a, including for example opposing capacitor plates 298a located in opposing relation to one another on opposing sides of substrate 292a for resonant frequency tuning.

Figure 12:
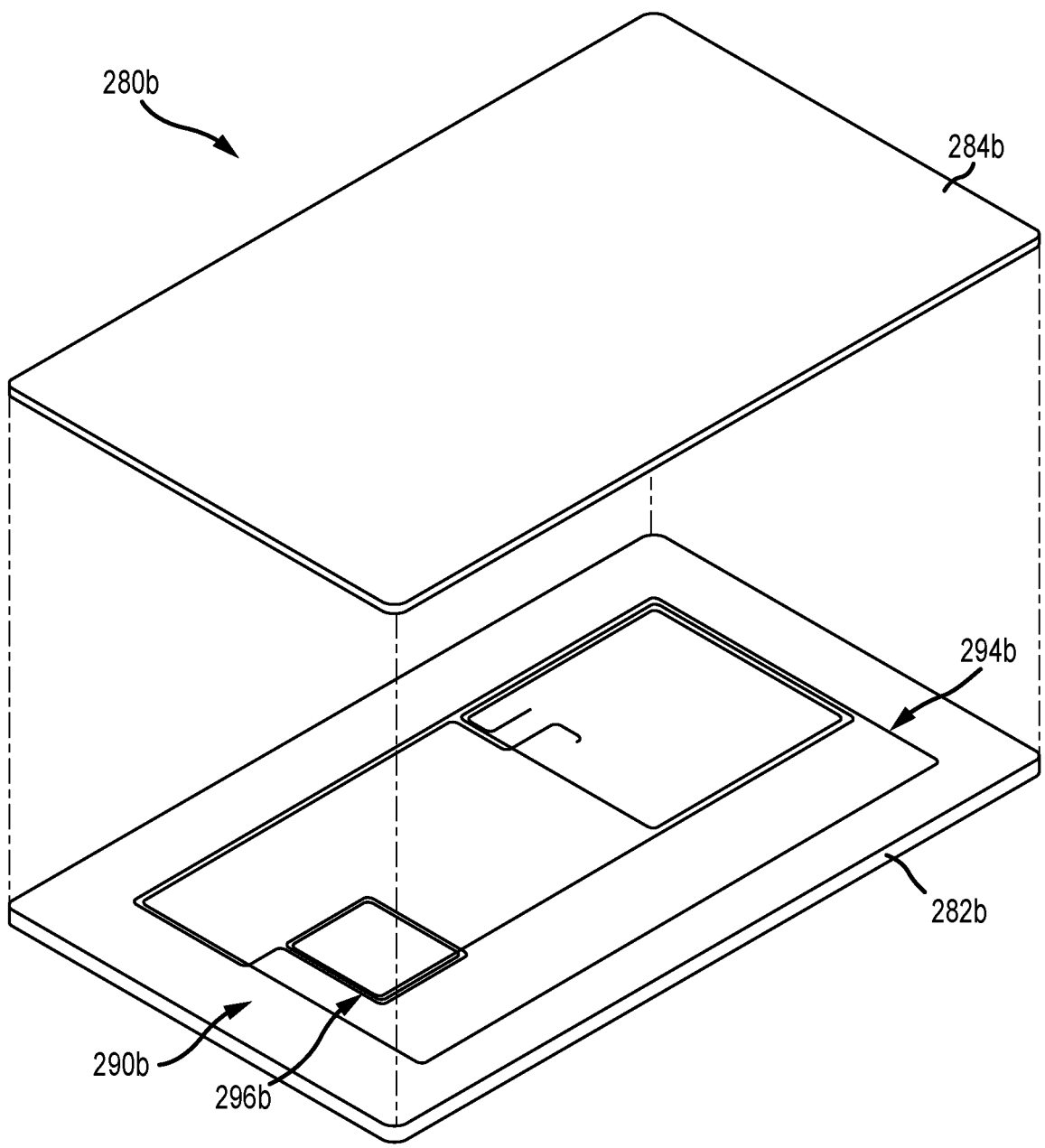
FIG. 12 is an exploded view of another embodiment of an inlay of the embodiment of FIG. 8.

Reference is now made to FIG. 12 which illustrates another embodiment of an inlay 280b having an inlay antenna 290b disposed between at least a portion of the first inlay layer 284b and a second inlay layer 284b. More particularly, the antenna 290b may be defined by a metallic wire that is at least partially embedded in the first inlay layer 282b. The inlay antenna 290b may comprise at least one outer metallic loop 294b and at least one interconnected, inner metallic loop 296b for signal transmissions. More particularly, upon assembly of the transaction card 201, the inlay 280b may be provided so that the inner metallic loop(s) 296b is located in overlapping relation to antenna 248 referenced above in relation to FIG. 8, thereby facilitating inductive coupling therebetween for signal transmissions to/from contactless card reader. In contemplated implementations, the inlay 280b and metallic member 210 may be provided so that, upon locating the inlay 280b in the opening 212 of the metallic member 210, the outer metallic loop(s) 294(b) is spaced from the metallic member 210 by a distance of at least 3 mm (i.e. 0.118 in.).

Figure 13:
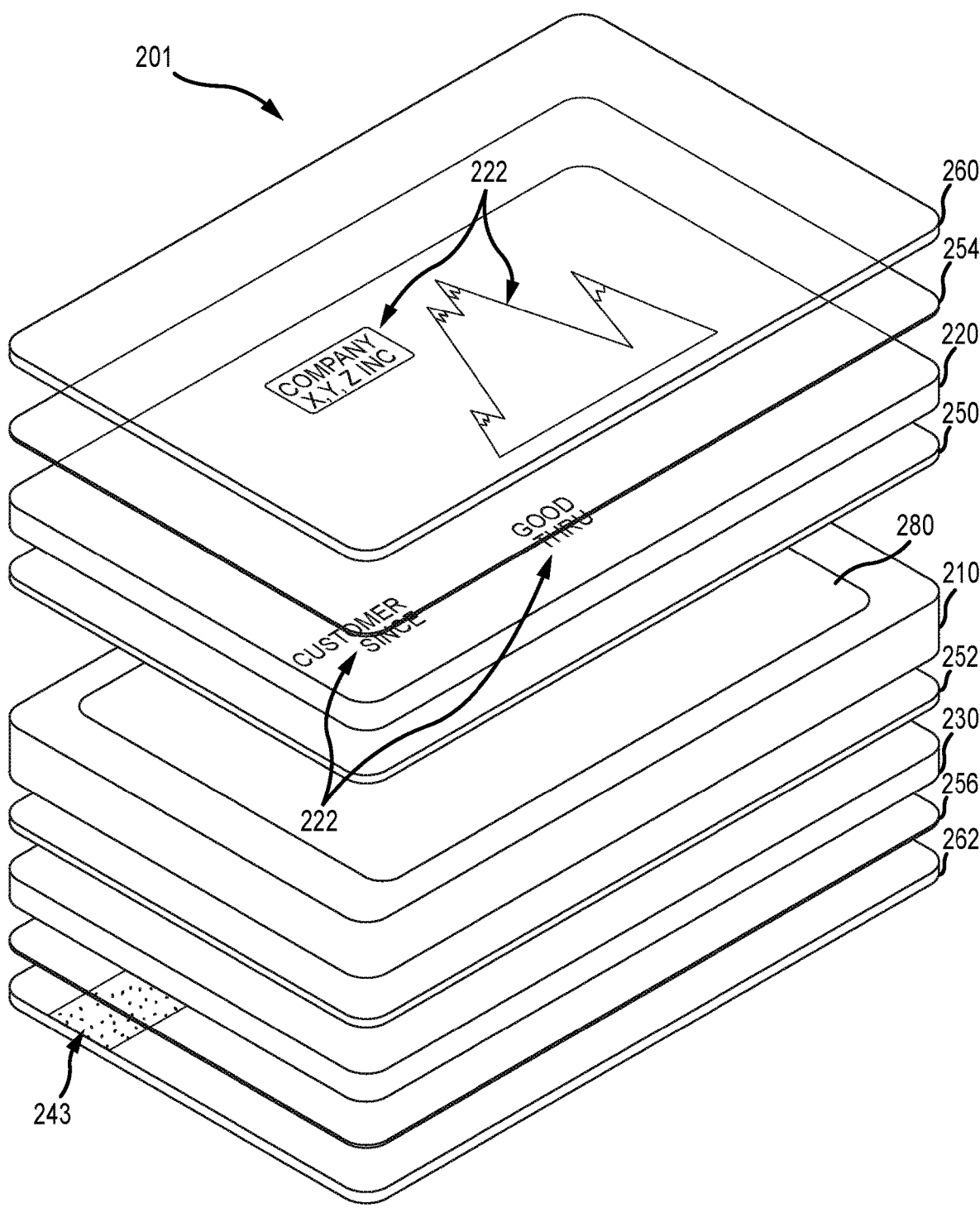
FIG. 13 is an exploded perspective view of various layers that may be provided in another embodiment of an edge-to-edge metal transaction card.

Reference is now made to FIG. 13 which illustrates various additional layers of a card body comprising the transaction card 201, wherein the thicknesses of such layers are exaggerated in relation to the length L and width W dimensions of the transaction card 201. As shown, in addition to the metallic member 210 with inlay 280, first core layer 220, and second core layer 230, the transaction card 201 may include a first inner polymer-based adhesive layer 250 disposed between and interconnecting the metallic member 210 with inlay 280 and the inward-facing side of the first core layer 220. Similarly, a second inner polymer-based adhesive layer 252 may be disposed between and interconnecting the metallic member 210 with inlay 280 and the inward-facing side of the second core layer 230. In one approach, the first inner polymer-based adhesive layer 250 may be provided as a thermosetting coating (e.g. a thermosetting resin) applied to a first side of the metallic members 210 and first side of inlay 280, and the second inner polymer-based adhesive layer 252 may be provided as a thermosetting coating (e.g. a thermosetting resin) applied to a second side of the metallic members 210 and a second side of inlay 280. In another approach, the first inner polymer-based adhesive layer 250 and/or the second inner polymer-based adhesive layer 252 may be provided as a thermoplastic coating (e.g. a thermosetting plastic resin) disposed on an outward-facing side of a corresponding carrier member that also has a thermoplastic coating (e.g. a thermosetting plastic resin) disposed on an inward-facing side thereof for interconnection to the metallic member 210.

As further shown in FIG. 13, transaction card 201 may include a first film layer 260 interconnected to an outward-facing side of the first core layer 220 and extending from edge-to-edge across the length L and the width W of the transaction card 201, and a second film layer 262 interconnected to an outward facing side of the second core layer 230 and extending from edge-to-edge across the length L and the width W of the transaction card 201. The first film layer 260 and/or the second film layer 262 may be transparent to facilitate the viewing of printing 222 and/or printing 232 that may be provided on the first core layer 220 and/or second core layer 230, respectively, as discussed above. The second film layer 262 may be provided with a magnetic stripe on an outward-facing side thereof.

Additionally, and as further shown in FIG. 13, transaction card 201 may include a first outer thermoset layer 254 disposed between and interconnecting the first core layer 220 and an inward-facing side of the first film layer 260. Similarly, a second outer thermoset layer 256 may be disposed between and interconnecting the second core layer 230 and the inward-facing side of the second film layer 262. In one approach, the first outer thermoset layer 254 may be provided as a thermosetting coating (e.g. a thermosetting adhesive) applied to an inward-facing side of the first film layer 260, and the second outer thermoset layer 256 may be provided as a thermosetting coating (e.g. a thermosetting adhesive) applied to an inward-facing side of the second film layer 262. In another approach, the first outer thermoset layer 254 may be provided as a thermosetting coating (e.g. a thermosetting adhesive) applied to an outward-facing side of the first core layer 220, and the second outer thermoset layer 256 may be provided as a thermosetting coating (e.g. a thermosetting adhesive) applied to an outward-facing side of the second core layer 230.

The metallic member 210 and additional layers described in relation to FIG. 8, FIG. 9, FIGS. 10A and 10B and/or FIG. 13 may be assembled in stacked relation to establish interconnections therebetween to provide the transaction card 201. For example, after stacked assembly of the layers, and prior to the provision of the visible indicia 240a, 240b, pocket 242, contact pads 244, IC chip 246, antenna 248, elite brand mark 241, signature block 245 and hologram 247, the assembled layers may be heated under pressure to a predetermined temperature range across the assembly of layers, wherein the polymer-based adhesive layers 250, 252, and thermoset layers 254 and 256 are activated, or cured, so as to fixedly interconnect the corresponding adjacent layers between which such thermoset layers 250, 252, 254 and 256 are disposed. The predetermined temperature range across the assembly of layers may be established to comprise temperatures lower than softening temperatures of the inlay 280 (e.g. inlay layers 282, 284) first core layer 220, second core layer 230, first film layer 260, and second film layer 262. More particularly, the predetermined temperature range across the assembly of layers may be from at least about 240° Fahrenheit to no more than, or less than, about 270° Fahrenheit.

In one example, a transaction card 201 may be provided with layers having the following thicknesses:

first film layer 260 with first outer thermoset layer 254 applied thereto: about 2 mils (0.051 mm);

first core layer 220 (e.g. with or without an optional metal face): about 5 mils-8 mils (0.127 mm-0.203 mm);

first inner polymer-based adhesive layer 250: about 1 mil-3 mils (0.025 mm-0.076 mm);

metallic member 210 and inlay 280: about 11 mils-12 mils (0.279 mm-0.305 mm); inlay 280: about 11 mils-12 mils (0.279 mm-0.305 mm);

second inner polymer-based adhesive layer 252; about 1 mil-3 mils (0.025 mm-0.076 mm);

second core layer 230 (e.g. with or without an optional metal face): about 5 mils-8 mils (0.127 mm-0.203 mm);

second film layer 262 with second outer thermoset layer 256 applied thereto: about 2 mils (0.051 mm).

In conjunction with such example, the transaction card 201 may have a post-lamination thickness of about 30 mils-33 mils (0.762 mm-0.838 mm). Further, the metallic member 210 may comprise stainless steel.

In some embodiments, subsequent to assembly and interconnection of the layers of the transaction card 201, the visible indicia 240, pocket 242, contact pads 244, IC chip 246, antenna 248, elite brand mark 241, signature block 245 and hologram 247 may be provided as shown in FIGS. 8 and 9. For example, the pocket 242 may be provided to extend through a portion of the thickness of the transaction card 201 from the first side thereof, wherein at least a portion of the pocket 242 extends entirely through the first film layer 260, first outer thermoset layer 254, first core layer 220, first inner thermoset layer 252, and through at least a portion of inlay 280.

In one approach, a first portion P1 of the pocket 242 may be defined by a first operation (e.g. milling) so that the first portion extends entirely through the noted layers, including the inlay 280 (e.g. through a region of the inlay 280 located within inner loop(s) 296a, 296b and a portion of the second core layer 220), and a second portion P2 of the pocket 242 may be defined by a second operation (e.g. milling) so that the second portion enlarges a cross-dimension of an open end of the pocket 242 through at least a portion of the first core layer 220, but does not extend to the antenna 290a, 290b of the inlay 280 of transaction card 201. For example, the second portion may be of a ring-shaped configuration that adjoins and extends about the first portion P1 at the first side of the transaction card 201, thereby defining a shelf within pocket 242.

Following the formation of pocket 242, contact pad 244, IC chip 246 and antenna 248 may be located in the pocket 242. In one approach, the contact pads 242 may be supportably interconnected to a top side of a substrate carrier, and the IC chip 246 and antenna 248 may be supportably interconnected to an opposing bottom side of the substrate carrier with one or more electrical connections provided between the IC chip 246 and antenna 248, and between the IC chip 246 and contact pads 244 to define an integrated IC chip module. In turn, the IC chip module may be secured within the pocket 242 (e.g. via an adhesive provided on at least the above-referenced shelf within the pocket 242), with at least a portion of the IC chip 246 projecting in to the first portion of pocket 242 that extends through at least a portion of the inlay 280. In the later regard, the IC chip 242 may be disposed free from electrical interconnection with the metallic member 210.

Additionally, subsequent to assembly and interconnection of the layers of the transaction card 201, optional elite brand mark 241, signature panel 245 and hologram 247 may be affixed (e.g. hot-stamped). Further, the visible indicia 240a, 240b may be defined, and the IC chip 246 and magnetic stripe 243 may be encoded with personalization data, during card personalization completion.

In contemplated arrangements, all or at least a portion of the visible indicia 240 may be defined at an outward-facing surface of the first film layer 260 (e.g. by at least one of laser engraving, ink jet printing and thermal printing). By way of particular example, visible indicia 240 may be defined at the outward-facing surface of the first film layer 260 by laser engraving, wherein the first film layer 260 may comprise a polymer-based material having a laser reactive material dispersed therein (e.g. carbon particles). When the visible indicia 240 is defined by any of laser engraving, ink jet printing and thermo-printing, a carbon containing ink may be utilized for printing on the first core layer 220 and/or second core layer 230. Alternatively, in laser engraving embodiments, carbonless ink may be utilized for printing on the first core layer 220 and/or second core layer 230. In some embodiments, transaction card 201 may be produced as one of a corresponding plurality of transaction cards to realize production efficiencies. In that regard, reference is now made to FIGS. 15-18 which illustrate a multi-sheet assembly 300 of multiple sheet layers having a plurality of sheet regions 301 from which a plurality of card bodies may be separated and further processed to yield a corresponding plurality of transaction cards, each as described above in relation to transaction card 201. While FIGS. 15-18 illustrate the assembly of a multi-sheet assembly 300 having four sheet regions 301 from which four card bodies may be separated (i.e. arranged in two rows and two columns), a larger multi-sheet assembly may be utilized to yield a greater number of card bodies (e.g. 28 card bodies arranged in 4 rows and 7 columns).

Figure 15:
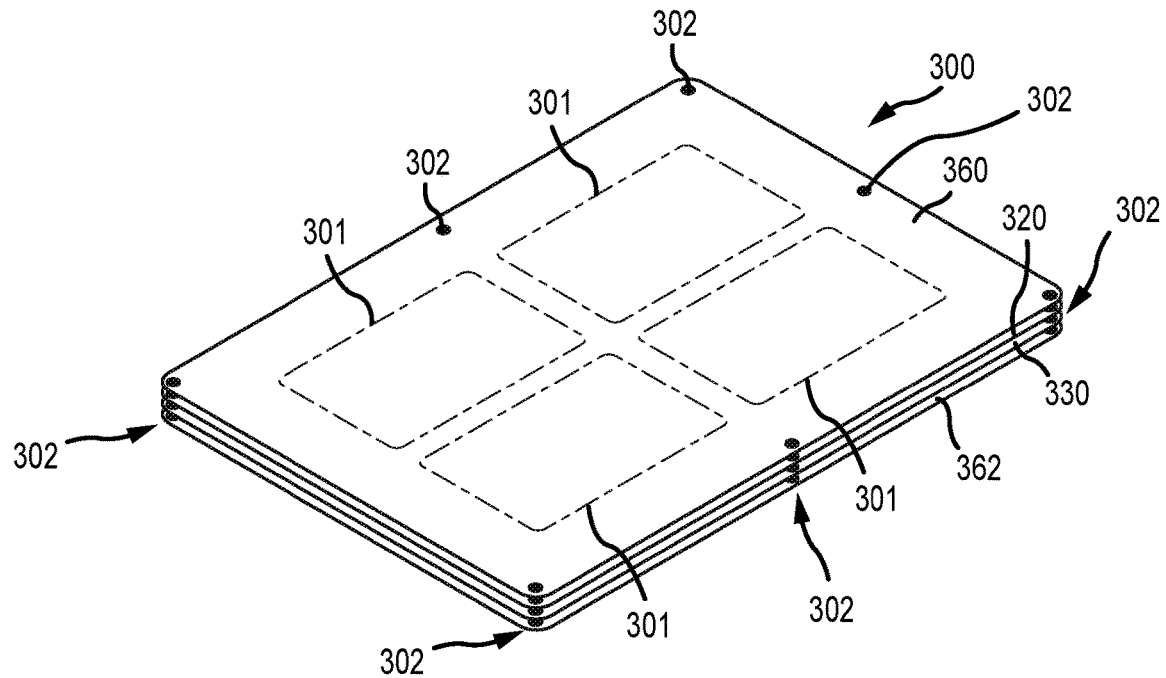
FIG. 15 is a perspective view of another embodiment of a multi-layer assembly for production of a plurality of edge-to-edge metal transaction cards.

With specific reference to FIG. 15, a first core sheet 320 (e.g. corresponding with first core layer 220) and second core sheet 330 (e.g. corresponding with second core layer 230) may be arranged so that inward-facing sides thereof are located in face-to-face relation. Additionally, a first film sheet 360 (e.g. corresponding with first film layer 260) and a second film sheet 362 (e.g. corresponding with second film layer 262)may be arranged so that inward-facing sides thereof are located in face-to-face relation to outward-facing sides of the first core sheet 320 and second core sheet 330, respectively.

Prior to arranging the multi-sheet assembly 300 as shown in FIG. 15, printing may be provided at each of a plurality of different locations (i.e. in corresponding relation to each of the plurality of sheet regions 301 from which card bodies will be separated) on the outward-facing side and/or inward-facing side of the first core sheet 320 to provide printing 222 as described above in relation to FIGS. 8 and 13. In that regard such printing 222 may be the same for each of the card bodies to be separated. Similarly, printing may be provided at each of a plurality of different locations (i.e. in corresponding relation to each of the plurality of sheet regions 301 from which the card bodies will be separated) on the outward-facing side and/or inward-facing side of the second core sheet 330 to provide printing 232 as described above in relation to FIGS. 9 and 13. In that regard, such printing 232 may be the same for each of the card bodies to be separated.

In some embodiments, prior to arranging the multi-sheet assembly 300 as shown in FIG. 15, the first core sheet 320 and/or the second core sheet 330 may be provided with a corresponding metal face on an outward-facing side thereof. In that regard, each metal face may be provided by laminating (e.g. adhering) a metallized film sheet to the given core layer.

In turn, printing analogous to printing 222 and/or 232 may be provided on a metal face of first core sheet 220 and/or second core sheet 230 (e.g. conventional and/or 3D printing with optional transparent, protecting printing provided thereupon), respectively, at each of a plurality of different locations (i.e. in corresponding relation to each of the plurality of sheet regions 301 from which a corresponding plurality of card bodies will be separated). In some embodiments, the providing of and printing upon a given metal face may be completed in a single, continuous automated operation.

With further reference to FIG. 15, the multi-sheet assembly 300 may be initially secured together at a plurality of spaced locations 302 during production so as to maintain the various sheets in predetermined registered relation to one another. For example, the inward-facing side of the first core sheet 320 and the inward-facing side of the second core sheet 330 may be secured together at a plurality of spaced locations 302 along at least two opposing and/or adjacent, peripheral side portions thereof (e.g. along three peripheral side edge portions as shown) to define an accessible space therebetween, and the inward-facing sides of the first film sheet 360 and the second film sheet 362 may be secured to outward-facing sides of the first core sheet 320 and second core sheet 330, respectively, at a corresponding plurality of spaced locations 302 along at least two opposing and/or adjacent, peripheral side edge portions thereof (e.g. along three peripheral side edge portions as shown). As illustrated, each of the securement locations 302 are located outside of the plurality of sheet regions 301 from which the card bodies will be separated. In one approach, each of the corresponding securement locations 302 may be achieved via spot-welding after arranging the various sheets as shown in FIG. 15 (e.g. via thermal spot welding, ultrasonic spot welding, laser spot welding, etc.).

Figure 16:
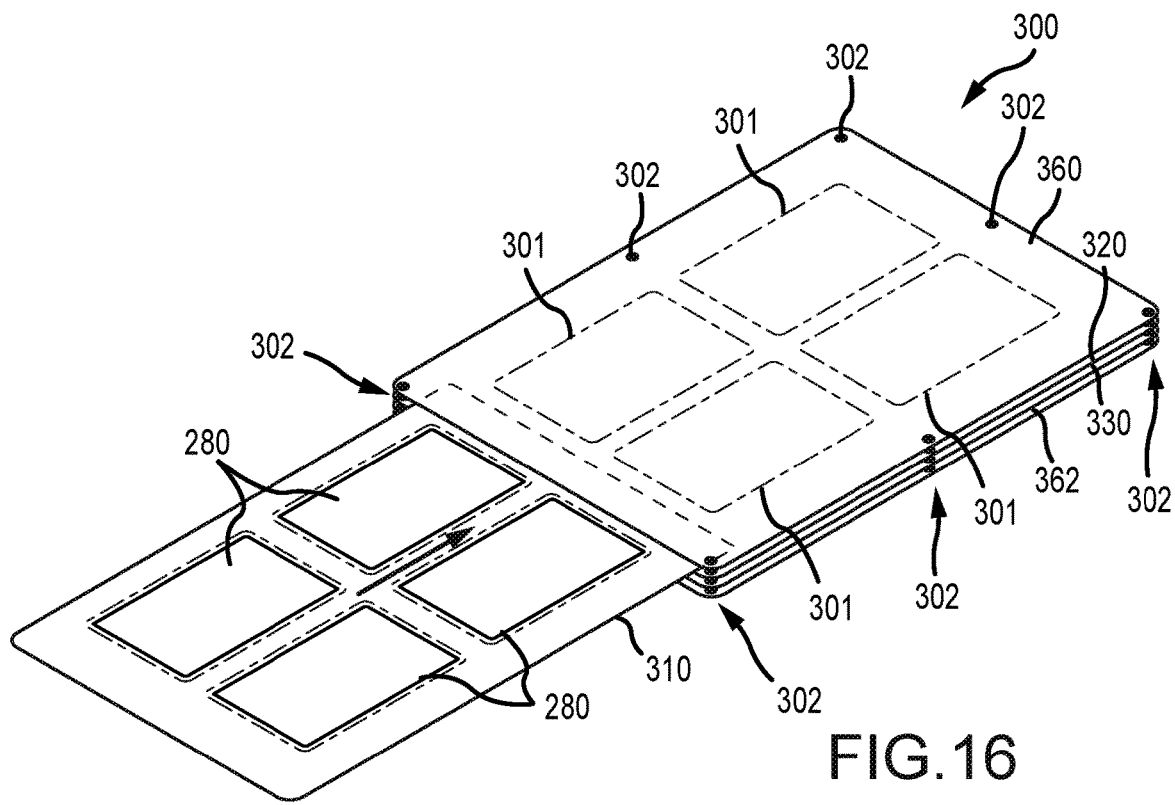
FIG. 16 is perspective view of the multi-layer assembly embodiment of FIG. 15 with the metallic sheet with inlays shown in FIG. 14D being positioned therewithin.
Figure 17:
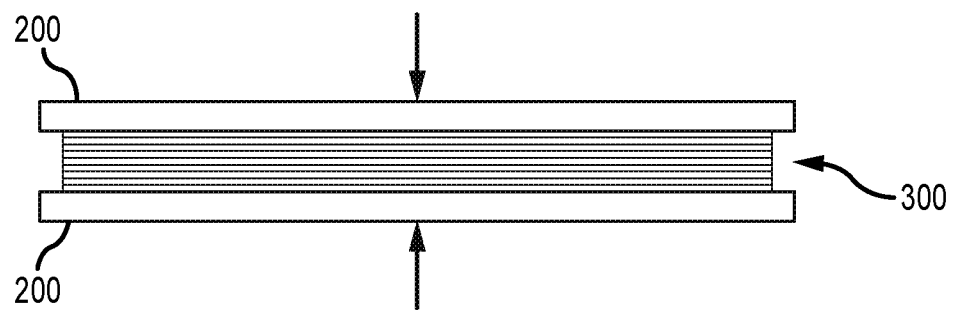
FIG. 17 is a side schematic view of the multi-layer assembly embodiment of FIGS. 15 and 16 during interconnection of the various layers thereof during production of a plurality of edge-to-edge metal transaction cards.

Reference is now made to FIG. 16. As shown, a metallic sheet 310 may be inserted in to the accessible space defined between the first core layer 320 and the second core layer 330 from an open end thereof. Such an approach facilitates positioning of the metallic sheet 310, first core sheet 320, second core sheet 330, first film sheet 360 and second film sheet 362, while maintaining the positions of the first core sheet 320, second core sheet 330 first film sheet 360 and second film sheet 362 in predetermined registered relation to one another.

As shown FIG. 16, the metallic sheet 310 may include a plurality of inlays 280 (e.g. as per inlay 280a or inlay 280b described above in relation to FIG. 11 or FIG. 12, respectively) in corresponding relation to the plurality of sheet regions 301 from which a plurality of card bodies will be separated. In that regard, each of the inlays 280 may be of a width and a length that is smaller than a length and width of the plurality of regions 301, thereby providing for a metallic frame about each of the inlays 280 upon separation of the plurality of card bodies.

Figure 14A:
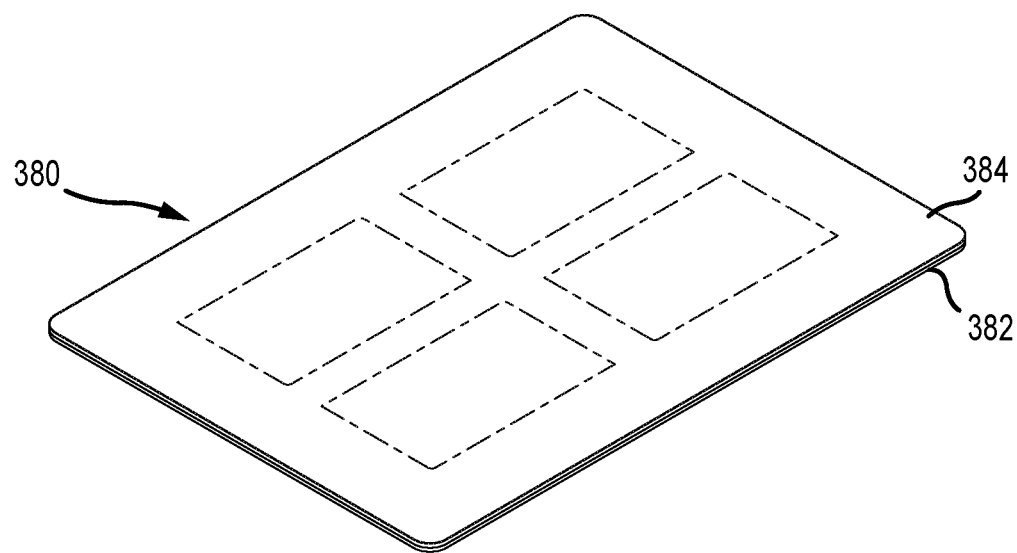
FIGS. 14A, and 14B are perspective views of an embodiment of an inlay sheet from which a plurality of inlays are separated for use in the production of a plurality of edge-to-edge metal transaction cards.
Figure 14B:
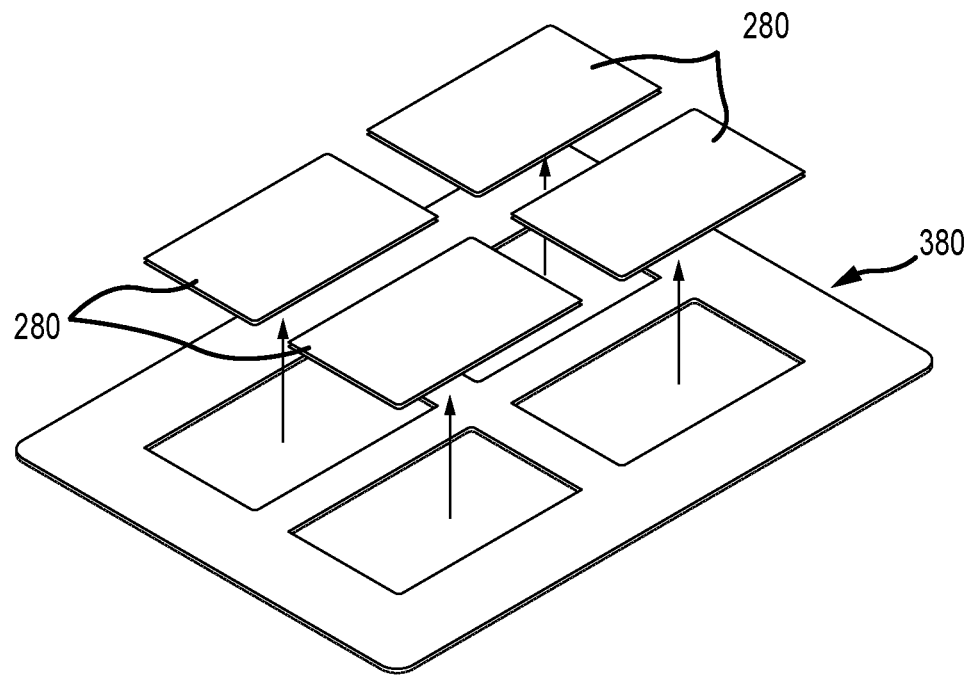
Figure 14C:
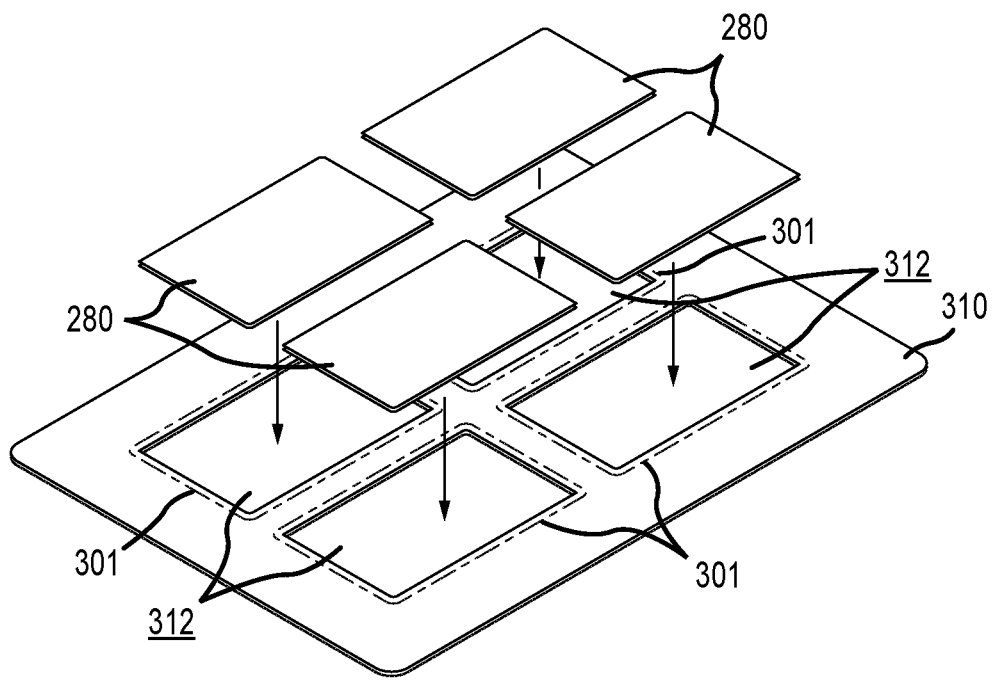
FIGS. 14C and 14D are perspective views of a metallic sheet having the plurality of inlays shown in FIG. 14B disposed within a plurality of openings of the metallic sheet.
Figure 14D:
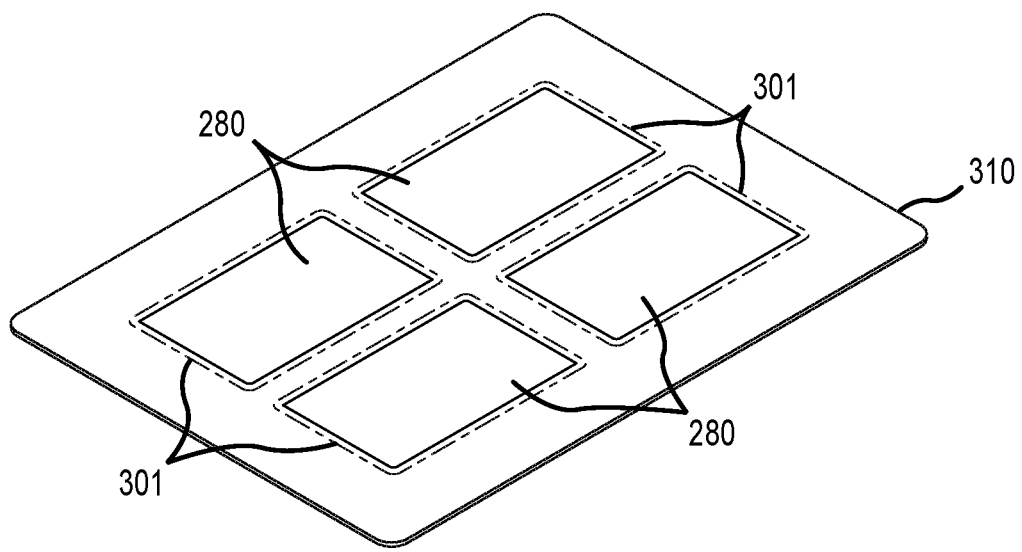

Further in that regard, and with reference now to FIGS. 14A, 14B, 14C and 14D, one approach for the construction of metallic sheet 310 will be described. In particular, in FIG. 14A an inlay sheet 380 is shown having a first inlay layer sheet 382 (e.g. corresponding with the first inlay layer 282*a* or 282*b* described above in relation to FIG. 11 or FIG. 12, respectively), and a second inlay layer sheet 384 interconnected thereto (e.g. corresponding with the second inlay layer 284*a* or 284*b* described above in relation to FIG. 11 or FIG. 12, respectively), with a plurality of inlay antennas located therebetween (e.g. described above in relation to FIG. 11 or FIG. 12), in corresponding relation to the plurality of inlays 280 comprising the metallic sheet 310 illustrated in FIG. 16. In turn, FIG. 14B illustrates the separation of the plurality of inlays 280 (e.g. via a punching operation or the like). In turn, FIG. 14C illustrates the disposition of the plurality of inlays 280 in to a corresponding plurality of openings 312 defined in the metallic sheet 310 (e.g. defined via a milling operation). As illustrated, the openings 312 and plurality of inlays 280 are sized to be slightly smaller in length and width than the corresponding plurality of sheet regions 301 that correspond with the plurality of card bodies to be separated from the assembly 300 shown in FIG. 16. As shown in FIG. 14D, upon positioning of the plurality of inlays 280 in the plurality of openings 312 of the metallic sheet 310, a substantially continuous sheet layer is defined for insertion in to the multi-sheet assembly 300, as described in relation to FIG. 16 hereinabove. Optionally, a thermosetting resin may be provided to fill or at least partially fill open space between inlays 280 and openings 312.

Further, and returning now to FIG. 16, in contemplated embodiments a first inner polymer-based adhesive sheet-like layer may be provided between the inward-facing side of the first core sheet 320 and a first side of the metallic sheet 310 facing the first core sheet 320, and a second inner polymer-based adhesive sheet-like layer may be provided between the inward-facing side of the second core sheet 330 and a second side of metallic sheet 310 facing the second core sheet 330 as part of the multi-sheet assembly 300. In one approach, a polymer-based adhesive (e.g. a thermoplastic and/or thermosetting coating) may be coated on the first side and/or second side of the metallic sheet. In another approach, a polymer-based adhesive (e.g. a thermoplastic and/or thermosetting coating) may be coated on the inward-facing side of the first core layer and/or second core layer. In yet another approach, a thermoplastic material may be coated on each side of a polymer-based carrier layer (e.g. a layer comprising polyethylene terephthalate) to define a carrier sheet, wherein a first carrier sheet is provided between the metallic member and the inward-facing side of the first core layer and a second carrier sheet is provided between the metallic sheet and the inward-facing side of the second core layer as part of the multi-sheet assembly. In one approach, at least one of the first and second carrier sheets may be adhered to the metallic sheet 310 in conjunction with the disposing of inlays 280 in openings 312.

Further, in contemplated embodiments a first outer thermosetting sheet-like layer may be provided between the outward-facing side of the first core sheet 320 and the inward-facing side of the first film sheet 360, and a second outer thermosetting sheet-like layer may be provided between the outward-facing side of the second core sheet 330 and the inward-facing side of the second film sheet 362 as part of the multi-sheet assembly 300. In one approach, the first and second outer sheet-like thermosetting layers may be coatings applied to the inward-facing sides of the first and second film sheets, respectively.

To interconnect the first film sheet 362, first core sheet 320, metallic sheet 310, second core sheet 330 and second film sheet 362, the multi-sheet assembly 300, the above-referenced polymer-based adhesive layers and thermosetting layers may be activated by heating then cooled to define layers corresponding with layers 250, 252, 254 and 256 referenced above. In that regard, and with reference to FIG. 17, heat and pressure may be applied to the multi-sheet assembly 300 via opposing platens 200 of a lamination device on opposing sides of the multi-sheet assembly 300. In some implementations, the applied heat may be provided so that a temperature within and across the multi-sheet assembly 300 (e.g. an assembly having a combined thickness of about 0.28 ml to 0.32 ml) reaches a temperature of at least 240° Fahrenheit and no more than, or less than, about 270° Fahrenheit. After heating, the platens 200 may be cooled to cool the multi-sheet assembly 300.

Figure 18:
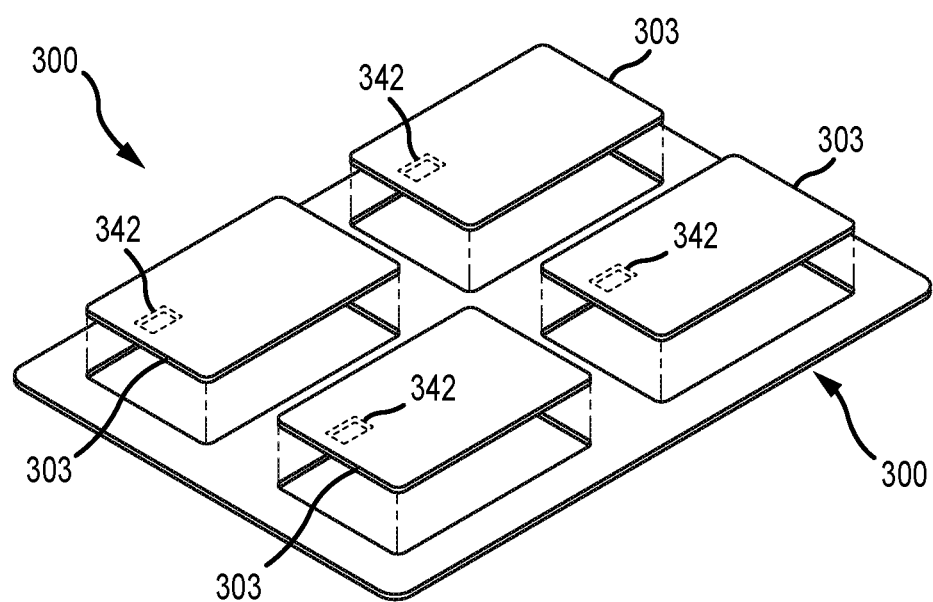
FIG. 18 is a perspective view of the multi-layer assembly embodiment of FIGS. 14-17 with the plurality of card bodies being separated therefrom during production of a plurality of edge-to-edge metal transaction cards.
Figure 19:
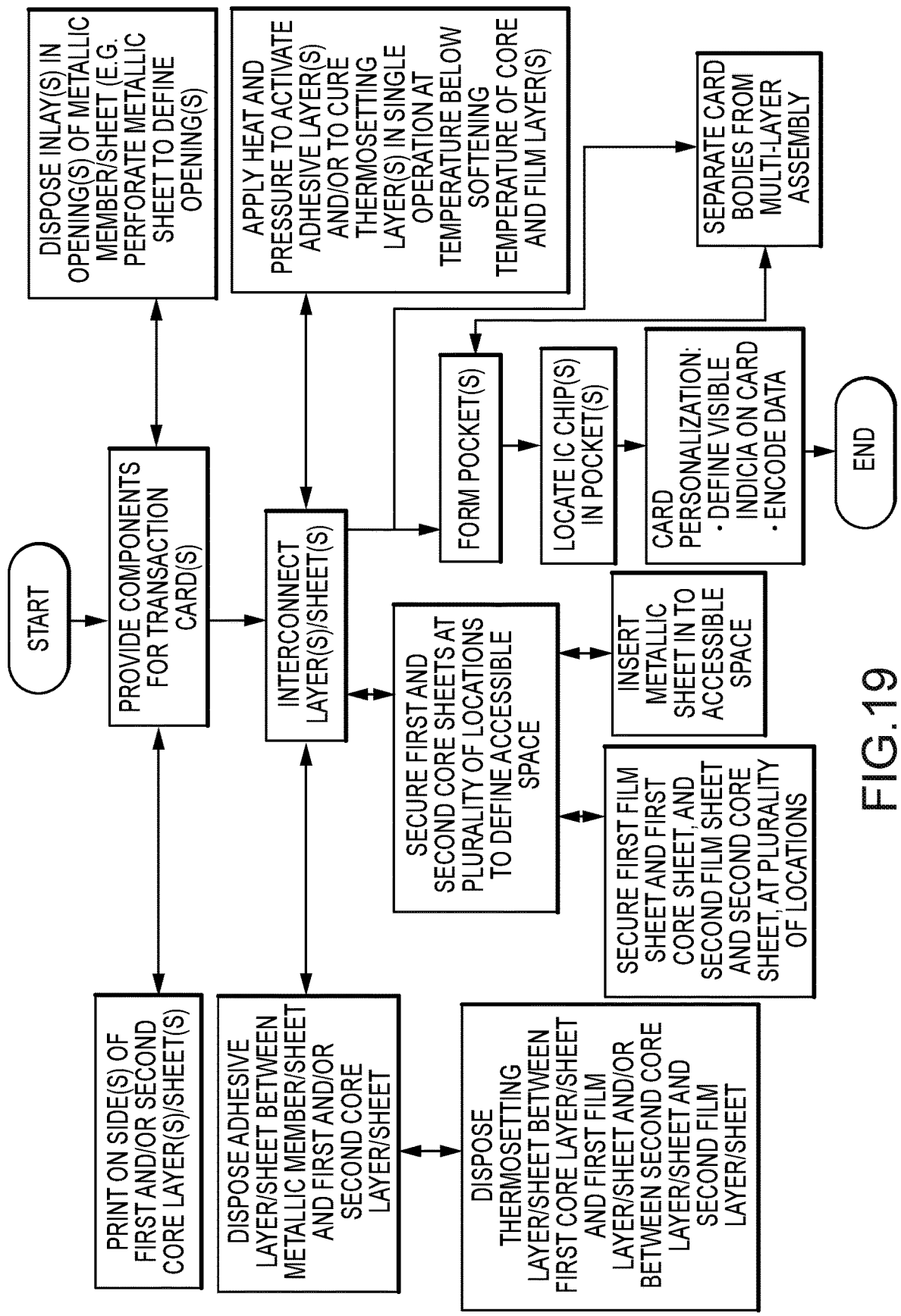
FIG. 19 is a process flow diagram corresponding with various method embodiments for production of edge-to-edge metal transaction cards.

Following interconnection of various sheets and thermoset layers of the multi-sheet assembly 300, a plurality of card bodies 303 may be separated from the multi-sheet assembly 300, as shown in FIG. 18. Further, prior to, in conjunction with, or after such separation, pockets 342 may be defined in predetermined relation to each of the card bodies 303 to be separated from the multi-sheet assembly 300. In one approach, each of the pockets 342 may be milled (e.g. utilizing a computer numeric controlled milling machine), followed by separation of the card bodies 303 from the multi-sheet assembly 300 via milling (e.g. utilizing a computer numeric controlled milling machine). In conjunction with such approach, the card bodies 303 may be separated from the multi-sheet assembly 300 first and the pockets 342 milled while the card bodies 303 are still being held in place by a vacuum fixture. In another approach, pockets (e.g. pocket portions P1 and P2 referenced above) may be milled separately in line on a smartcard standalone milling machine or on an inline milling station on a smart card machine.

In other embodiments, the card bodies 303 may be separated from the multi-sheet assembly via a punch and optional polish operation. In turn, the pockets 342 may be milled before or after punching (e.g. while the card bodies 303 are still being held in place by a vacuum fixture). In another approach, pockets 342 (e.g. pocket portions P1 and P2 referenced above) may be milled separately after punching in line on a smartcard standalone milling machine or on an inline milling station on a smart card machine.

Following the separation of card bodies 303, the card bodies 303 may be cleaned as necessary, and peripheral edges of the card bodies 303 may be polished if desired. In turn, the card bodies 303 may be further processed to yield a plurality of transaction cards, each having features as described above in relation to transaction card 201.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain known modes of practicing the invention and to enable others skilled in the art to utilize the invention in such or other embodiments and with various modifications required by the particular application(s) or use(s) of the present invention. It is intended that the appended claims be construed to include alternative embodiments to the extent permitted by the prior art.

What is claimed is:

1. A transaction card having a length and width, comprising:
    a metallic member extending from edge-to-edge across the length and width of the transaction card, wherein said metallic member defines a first area of at least about 80% of a second area defined by the length and width of the transaction card, and wherein a weight of the metallic member comprises not less than about 40% of a total weight of the transaction card;
    a transparent first polymeric core layer interconnected to a first side of the metallic member and extending from edge-to-edge across the length and width of the transaction card, wherein said first polymeric core layer includes printing on an inward-facing side thereof, wherein the printing and the metallic member are visible through a first side of the transaction card;
    a second polymeric core layer interconnected to a second side of the metallic member and extending from edge-to-edge across the length and width of the transaction card, wherein a thickness of the metallic member is at least 1.5 times greater than each a thickness of said first polymeric core layer and a thickness of said second polymeric core layer, and wherein the metallic member and the first and second core layers each extend continuously about and are visible about an entire peripheral edge of the transaction card;
    a transparent first inner polymer-based adhesive layer disposed between the metallic member and said inward-facing side of said first polymeric core layer, in direct contact with said inward-facing side of the first polymeric core layer and said printing thereupon, in direct contact with the metallic member; and,
    visible indicia indicative of an account associated with the transaction card, wherein the visible indicia is provided at least at one of an outward-facing surface of the first side and an outward-facing surface of an opposing second side of the transaction card, free from embossment of the transaction card.

2. A transaction card as recited in claim 1, wherein said second polymeric core layer is transparent and includes printing on an inward-facing side thereof and visible through a second side of the transaction card opposite to said first side thereof.

3. A transaction card as recited in claim 2, further comprising:
    a transparent second inner polymer-based adhesive layer disposed between and interconnecting said metallic member and said inward-facing side of said second polymeric core layer, in direct contact with said inward-facing side of the second polymeric core layer and said at least one of said printing thereupon.

4. A transaction card as recited in claim 1, wherein said visible indicia is provided at said first side of the transaction card.

5. A transaction card as recited in claim 4, further comprising:
    a transparent first outer film layer attached to an outward-facing side of said first polymeric core layer and extending from edge-to-edge across the length and width of the transaction card, wherein said visible indicia is defined at an outward-facing surface of said first film layer.

6. A transaction card as recited in claim 5, wherein the transparent first outer film layer comprises a laser-reactive material and said visible indicia is defined by laser engraving.

7. A transaction card as recited in claim 5, further comprising:
    a transparent first outer thermoset layer disposed between and attaching the outward-facing side of the first polymeric core layer and an inward-facing side of the transparent first outer film layer.

8. A transaction card as recited in claim 7, further comprising:
    a second outer film layer attached to an outward-facing side of the second polymeric core layer and extending from edge-to-edge across the length and width of the transaction card; and,
    a second outer thermoset layer interposed between and attaching said outward-facing side of the second polymeric core layer and an inward-facing side of the second outer film layer.

9. A transaction card as recited in claim 8, wherein said metallic member is non-magnetic, and further comprising:
    a magnetic stripe for storing data associated with said account, wherein said magnetic stripe is provided on a second side of the transaction card opposite to said first side thereof.

10. A transaction card as recited in claim 4, further comprising:
    a pocket extending in to said transaction card from said first side thereof, wherein said pocket extends completely through said first polymeric core layer and said metallic member; and,
    an integrated circuit chip for storing data associated with said account, wherein said integrated circuit chip is disposed in said pocket free from electrical interconnection with said metallic member.

11. A transaction card as recited in claim 10, further comprising:
    a plurality of contact pads for electrical contact interface with a contact chip card reader, wherein said plurality of contact pads are located and exposed within said pocket, and wherein at least a portion of the plurality of contact pads are in electrical contact with said integrated circuit chip.

12. A transaction card as recited in claim 1, wherein said second polymeric core layer is transparent and said metallic member is visible through said second side of the transaction card.

13. A transaction card as recited in claim 1, wherein the weight of the metallic member comprises not more than about 90% of the total weight of the transaction card.

14. A transaction card as recited in claim 13, wherein the total weight of the transaction card is between about 8 g and 30 g.

15. A transaction card as recited in claim 1, wherein said metallic member, said first polymeric core layer and said second polymeric core layer each have corresponding thicknesses that are substantially constant across an entirety of the transaction card.

16. A transaction card as recited in claim 15, wherein the thickness of said first polymeric core layer and the thickness of said second polymeric core layer are substantially equal.

17. A transaction card as recited in claim 1, wherein the thickness of the metallic member is at least 2 to 3 times greater the thickness of said first polymeric core layer and the thickness of said second polymeric core layer.

18. A transaction card as recited in claim 1, wherein the first polymeric core layer and the second polymeric core layer each comprise a common polymeric material or different polymeric materials, and wherein the metallic member comprises at least one of the following:

stainless steel;
palladium;
platinum;
gold;
silver;
or tungsten.

19. A transaction card as recited in claim 1, wherein the second polymeric core layer is provided with a metal face on an outward-facing side thereof.

20. A method for producing a transaction card having a length and width, comprising:
printing on a side of a transparent first polymeric core layer;
interconnecting, after the printing, said first polymeric core layer and a second polymeric core layer to opposing sides of a metallic member with said side of the first polymeric core layer inward-facing said metallic member, wherein said metallic member and said first and second polymeric core layers each extend from edge-to-edge across the length and width of the transaction card, wherein said metallic member defines a first area of at least about 80% of a second area defined by the length and width of the transaction card, wherein a weight of the metallic member comprises not less than about 40% of the transaction card, wherein said printing and said metallic member are visible through a first side of the transaction card, wherein a thickness of the metallic member is at least 1.5 times greater than a thickness of said first polymeric core layer and a thickness of said polymeric second core layer, and wherein the metallic member and the first and second polymeric core layers each extend continuously about and are visible about an entire peripheral edge of the transaction card, wherein the interconnecting comprises disposing a first inner polymer-based adhesive layer between the metallic member and the inward-facing side of the first core layer, in direct contact with the inward-facing side of the first core layer and the printing thereupon, in direct contact with the metallic member; and,
defining, after the interconnecting, visible indicia indicative of an account associated with the transaction card at least at one of an outward-facing surface of said first side and an outward-facing surface of an opposing second side of the transaction card, free from embossment of the transaction card.

21. A method as recited in claim 20, wherein said interconnecting further comprises:
disposing a second inner polymer-based adhesive layer between said metallic member and an inward-facing side of said second polymeric core layer, in direct contact with said inward-facing side of the second core layer.

22. A method as recited in claim 21, wherein prior to said interconnecting the method further comprises:
printing on the inward-facing side of the second polymeric core layer, wherein said second inner polymer-based adhesive layer is transparent, and wherein said printing is visible through the second side of the transaction card.

23. A method as recited in claim 21, wherein said interconnecting further comprises:
activating the first inner polymer-based adhesive layer and the second inner polymer-based adhesive layer in a single operation.

24. A method as recited in claim 23, wherein said activating comprises:
applying heat and pressure to an outward-facing side of said first core layer and to an outward-facing side of said second core layer.

25. A method as recited in claim 23, wherein prior to said activating the method further comprises:
attaching a transparent first film layer to an outward-facing side of the first polymeric core layer and a second film layer to an outward-facing side of the second polymeric core layer, wherein said transparent first film layer and said second film layer each extend from edge-to-edge across the length and width of the transaction card.

26. A method as recited in claim 25, wherein said attaching comprises:
disposing a transparent first outer thermosetting layer between an outward-facing side of said first polymeric core layer and an inward-facing side of said transparent first film layer;
disposing a second outer thermosetting layer between said outward-facing side of said second polymeric core layer and an inward-facing side of said second film layer; and
curing said first outer thermosetting layer and said second outer thermosetting layer in said single operation with said activating.

27. A method as recited in claim 20, wherein the first and second core layers are polymer-based layers, and wherein said single operation comprises:
applying heat to an outward-facing surface of said first film layer and to an outward-facing surface of said second film layer, wherein said heat is applied to obtain a temperature of at least about 240° Fahrenheit and no more than about 270° Fahrenheit across the first and second film layers, first and second outer thermosetting layers, first and second polymeric core layers, and first and second inner polymer-based adhesive layers.

28. A method as recited in claim 20, wherein said defining comprises at least one of:
laser engraving;
ink-jet printing; and,
thermo-printing.

29. A method as recited in claim 20, wherein after said interconnecting and prior to said defining said method further comprises:
forming a pocket that extends in to said transaction card from said first side thereof, wherein said pocket extends completely through said first polymeric core layer and said metallic member.

30. A method as recited in claim 29, further comprising:
locating an integrated circuit chip, and a plurality of contact pads disposed for electrical contact interface with a contact chip card reader, within said pocket.

31. A method as recited in claim 20, wherein prior to said interconnecting the method further comprises:
affixing a magnetic stripe to one of said first side and said second side of the transaction card.

32. A method as recited in claim 20, wherein said transaction card is one of a plurality of transaction cards, and further comprising:
imprinting at each of a plurality of different locations on a side of a transparent first core sheet to complete the printing for each of said plurality of transaction cards;
connecting said first core sheet and a second core sheet to opposing first and second sides of a metallic sheet with said printed side of the first core sheet inward-facing the metallic sheet as part of a multi-sheet assembly to complete the interconnecting for each of the plurality of transaction cards; and, separating, after said connecting, a plurality of card bodies from a corresponding plurality of sheet regions of the multi-sheet assembly in corresponding relation to said plurality of transaction cards.

33. A method for producing a transaction card having a length and width, comprising:

printing on a side of a transparent first polymeric core layer;

interconnecting, after the printing, said first polymeric core layer and a second polymeric core layer to opposing sides of a metallic member with said side of the first polymeric core layer inward-facing said metallic member, wherein said metallic member and said first and second polymeric core layers each extend from edge-to-edge across the length and width of the transaction card, and wherein said printing is visible through a first side of the transaction card, wherein the interconnecting comprises:

disposing a first inner polymer-based adhesive layer between the metallic member and the inward-facing side of the first polymeric core layer, in direct contact with the inward-facing side of the first polymeric core layer and the printing thereupon, in direct contact with the metallic member;

disposing a second inner polymer-based adhesive layer between said metallic member and an inward-facing side of said second polymeric core layer, in direct contact with said inward-facing side of the second polymeric core layer; and, activating the first inner polymer-based adhesive layer and the second inner polymer-based adhesive layer in a single operation;

attaching a transparent first film layer to an outward-facing side of the first polymeric core layer and a second film layer to an outward-facing side of the second polymeric core layer, wherein said first film layer and said second film layer each extend from edge-to-edge across the length and width of the transaction card, wherein said attaching comprises:

disposing a transparent first outer thermosetting layer between an outward-facing side of said first polymeric core layer and an inward-facing side of said first film layer;

disposing a second outer thermosetting layer between said outward-facing side of said second polymeric core layer and an inward-facing side of said second film layer; and, curing said first outer thermosetting layer and said second outer thermosetting layer in said single operation with said activating; and, defining, after the interconnecting, visible indicia indicative of an account associated with the transaction card at one of said first side and an opposing second side of the transaction card.

34. A transaction card having a length and width, the transaction card comprising:

a metallic member extending from edge-to-edge across the length and width of the transaction card such that the metallic member extends continuously about an entire peripheral edge of the transaction card;

a transparent first polymeric core layer interconnected to a first side of the metallic member and extending from edge-to-edge across the transaction card such that the transparent first polymeric core layer extends continuously about the entire peripheral edge of the transaction card, wherein the transparent first polymeric core layer includes printing on an inward-facing side thereof, wherein the printing and the metallic member are visible through a first side of the transaction card;

a second polymeric core layer interconnected to a second side of the metallic member and extending from edge-to-edge across the length and width of the transaction card such that the second polymeric core layer extends continuously about the entire peripheral edge of the transaction card; and a transparent first inner polymer-based adhesive layer disposed between the metallic member and the inward-facing side of the first polymeric core layer, in direct contact with the inward-facing side of the first polymeric core layer and the printing thereupon, in direct contact with the metallic member.

* * * * *